(12) United States Patent
Motoyama et al.

(10) Patent No.: US 7,417,660 B2
(45) Date of Patent: Aug. 26, 2008

(54) IMAGE FORMING APPARATUS AND IMAGE FORMING METHOD

(75) Inventors: Hajime Motoyama, Moriya (JP); Hajime Kaji, Abiko (JP); Naoto Yamada, Kawasaki (JP); Yoshitaka Yamazaki, Toride (JP); Junichi Noguchi, Toride (JP); Takayuki Kawakami, Hakusan (JP); Satoshi Ogawara, Abiko (JP); Yushi Oka, Abiko (JP); Akihito Mori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 11/205,587

(22) Filed: Aug. 17, 2005

(65) Prior Publication Data

US 2006/0038872 A1 Feb. 23, 2006

(30) Foreign Application Priority Data

| Aug. 20, 2004 | (JP) | ............................. 2004-241163 |
| Jun. 30, 2005 | (JP) | ............................. 2005-192016 |
| Aug. 8, 2005 | (JP) | ............................. 2005-229457 |

(51) Int. Cl.
*B41J 2/44* (2006.01)
(52) U.S. Cl. ..................................... 347/252
(58) Field of Classification Search ................. 347/130, 347/132, 237, 240, 247, 251, 252
See application file for complete search history.

(56) References Cited

U.S. PATENT DOCUMENTS 6,111,664 A * 8/2000 Aoki et al. .................. 358/448
7,031,020 B1 * 4/2006 Aoki et al. .................. 358/1.9

FOREIGN PATENT DOCUMENTS

JP 07-294837 11/1995

\* cited by examiner

*Primary Examiner*—Huan H Tran
(74) *Attorney, Agent, or Firm*—Canon USA Inc IP Div

(57) ABSTRACT

An image forming apparatus generates a PWM signal corresponding to input image data and controls a timing of a light source to emit a light beam based on the PWM signal in order to perform tone reproduction. The image forming apparatus includes a data processing unit configured to generate the PWM signal for one pixel based on image data for continuous two pixels in the image data. The data processing unit selects an origin of pulse growth in generation of the PWM signal for one pixel in accordance with the image data for the two pixels to generate the PWM signal.

10 Claims, 20 Drawing Sheets

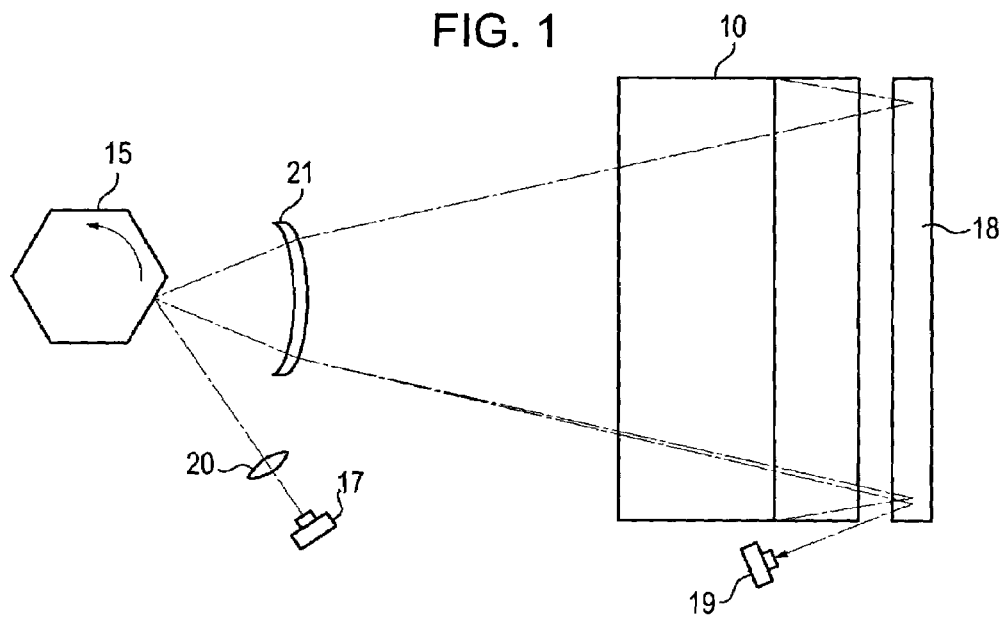
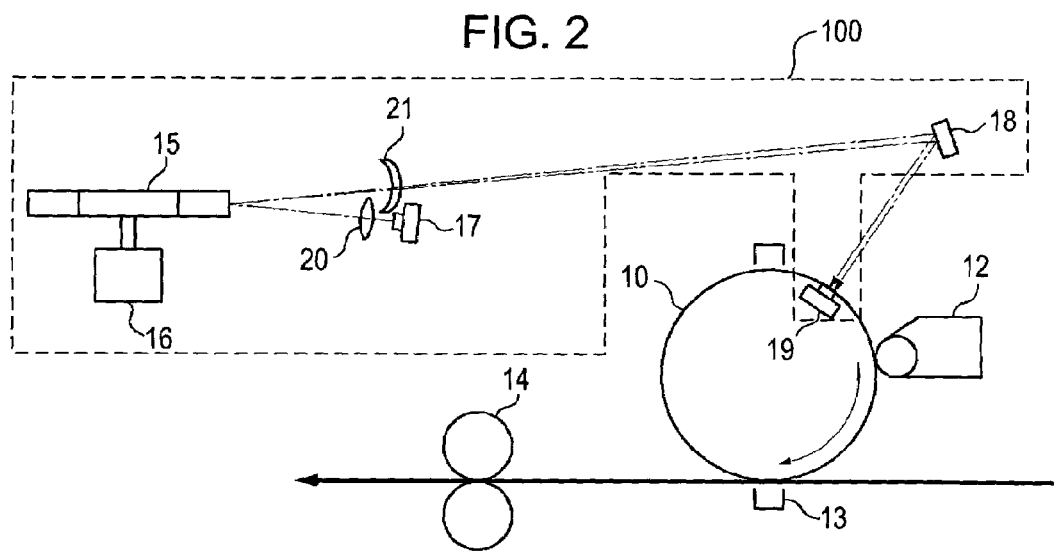

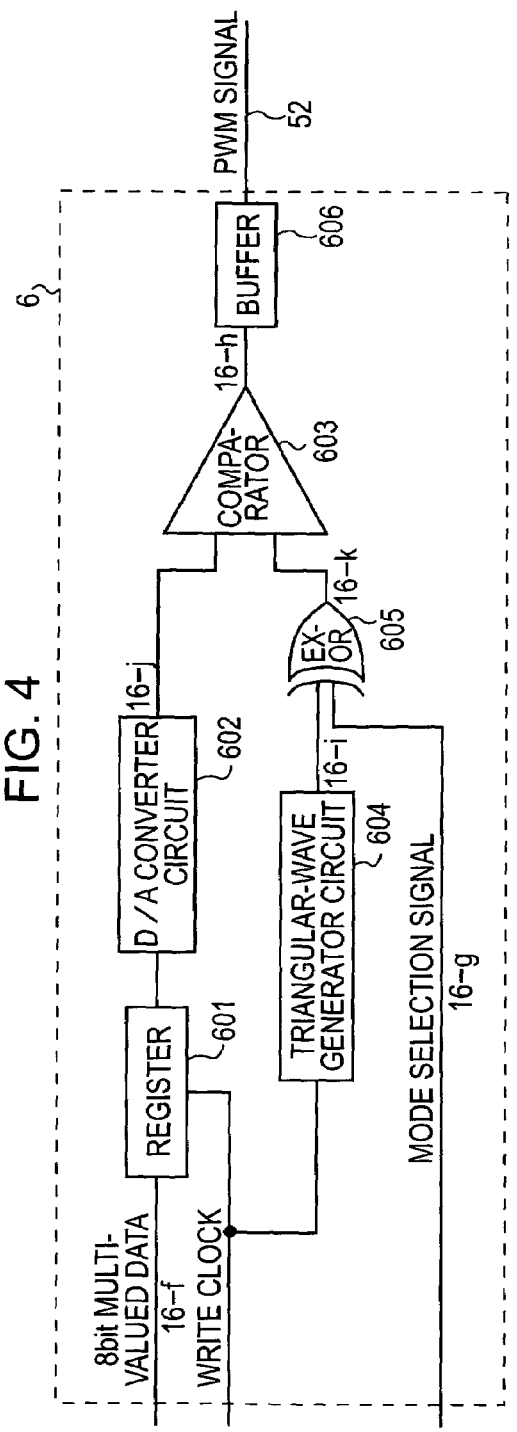
FIG. 4
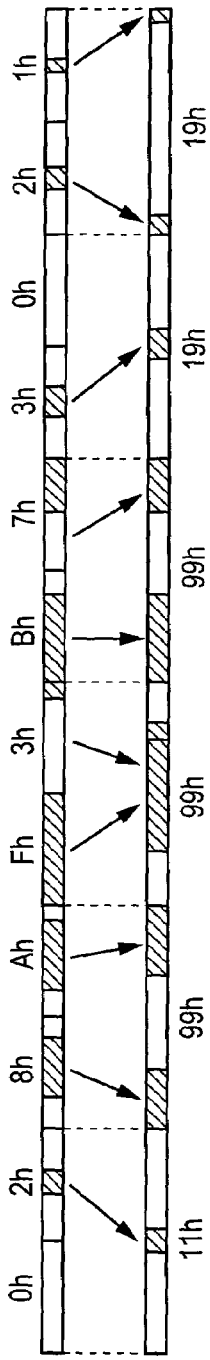
FIG. 5A
FIG. 5B

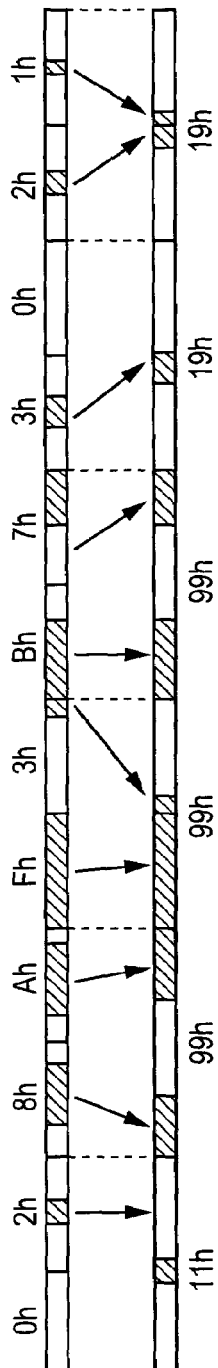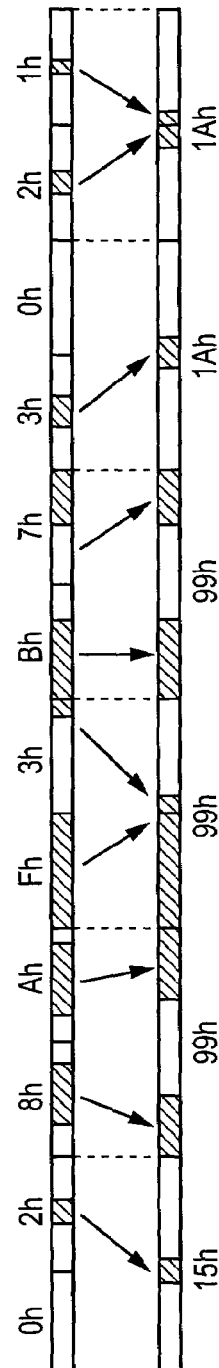

FIG. 17

| | | 4 BIT EVEN-NUMBERED DATA | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| 4 BIT ODD-NUMBERED DATA | 0 | 00 | 08 | 11 | 19 | 22 | 2A | 33 | 3B | 44 | 4C | 55 | 5D | 66 | 6E | 77 | 7F |
| | 1 | 08 | 11 | 19 | 22 | 2A | 33 | 3B | 44 | 4C | 55 | 5D | 66 | 6E | 77 | 7F | 88 |
| | 2 | 11 | 19 | 22 | 2A | 33 | 3B | 44 | 4C | 55 | 5D | 66 | 6E | 77 | 7F | 88 | 90 |
| | 3 | 19 | 22 | 2A | 33 | 3B | 44 | 4C | 55 | 5D | 66 | 6E | 77 | 7F | 88 | 90 | 99 |
| | 4 | 22 | 2A | 33 | 3B | 44 | 4C | 55 | 5D | 66 | 6E | 77 | 7F | 88 | 90 | 99 | A1 |
| | 5 | 2A | 33 | 3B | 44 | 4C | 55 | 5D | 66 | 6E | 77 | 7F | 88 | 90 | 99 | A1 | AA |
| | 6 | 33 | 3B | 44 | 4C | 55 | 5D | 66 | 6E | 77 | 7F | 88 | 90 | 99 | A1 | AA | B2 |
| | 7 | 3B | 44 | 4C | 55 | 5D | 66 | 6E | 77 | 7F | 88 | 90 | 99 | A1 | AA | B2 | BB |
| | 8 | 44 | 4C | 55 | 5D | 66 | 6E | 77 | 7F | 88 | 90 | 99 | A1 | AA | B2 | BB | C3 |
| | 9 | 4C | 55 | 5D | 66 | 6E | 77 | 7F | 88 | 90 | 99 | A1 | AA | B2 | BB | C3 | CC |
| | A | 55 | 5D | 66 | 6E | 77 | 7F | 88 | 90 | 99 | A1 | AA | B2 | BB | C3 | CC | D4 |
| | B | 5D | 66 | 6E | 77 | 7F | 88 | 90 | 99 | A1 | AA | B2 | BB | C3 | CC | D4 | DD |
| | C | 66 | 6E | 77 | 7F | 88 | 90 | 99 | A1 | AA | B2 | BB | C3 | CC | D4 | DD | E5 |
| | D | 6E | 77 | 7F | 88 | 90 | 99 | A1 | AA | B2 | BB | C3 | CC | D4 | DD | E5 | EE |
| | E | 77 | 7F | 88 | 90 | 99 | A1 | AA | B2 | BB | C3 | CC | D4 | DD | E5 | EE | F6 |
| | F | 7F | 88 | 90 | 99 | A1 | AA | B2 | BB | C3 | CC | D4 | DD | E5 | EE | F6 | FF |

FIG. 19

| | | 4 BIT EVEN-NUMBERED DATA | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| 4 BIT ODD-NUMBERED DATA | 0 | 0 | 0 | 0 | 0 | 0 | 0 | 0 | 0 | 0 | 0 | 0 | 0 | 0 | 0 | 0 | 1 |
| | 1 | 0 | 0 | 0 | 0 | 0 | 0 | 0 | 0 | 0 | 0 | 0 | 0 | 0 | 0 | 1 | 1 |
| | 2 | 0 | 0 | 0 | 0 | 0 | 0 | 0 | 0 | 0 | 0 | 0 | 0 | 0 | 1 | 1 | 1 |
| | 3 | 0 | 0 | 0 | 0 | 0 | 0 | 0 | 0 | 0 | 0 | 0 | 0 | 1 | 1 | 1 | 1 |
| | 4 | 0 | 0 | 0 | 0 | 0 | 0 | 0 | 0 | 0 | 0 | 0 | 1 | 1 | 1 | 1 | 1 |
| | 5 | 0 | 0 | 0 | 0 | 0 | 0 | 0 | 0 | 0 | 0 | 1 | 1 | 1 | 1 | 1 | 1 |
| | 6 | 0 | 0 | 0 | 0 | 0 | 0 | 0 | 0 | 0 | 1 | 1 | 1 | 1 | 1 | 1 | 1 |
| | 7 | 0 | 0 | 0 | 0 | 0 | 0 | 0 | 0 | 1 | 1 | 1 | 1 | 1 | 1 | 1 | 1 |
| | 8 | 0 | 0 | 0 | 0 | 0 | 0 | 0 | 1 | 1 | 1 | 1 | 1 | 1 | 1 | 1 | 1 |
| | 9 | 0 | 0 | 0 | 0 | 0 | 0 | 1 | 1 | 1 | 1 | 1 | 1 | 1 | 1 | 1 | 1 |
| | A | 0 | 0 | 0 | 0 | 0 | 1 | 1 | 1 | 1 | 1 | 1 | 1 | 1 | 1 | 1 | 1 |
| | B | 0 | 0 | 0 | 0 | 1 | 1 | 1 | 1 | 1 | 1 | 1 | 1 | 1 | 1 | 1 | 1 |
| | C | 0 | 0 | 0 | 1 | 1 | 1 | 1 | 1 | 1 | 1 | 1 | 1 | 1 | 1 | 1 | 1 |
| | D | 0 | 0 | 1 | 1 | 1 | 1 | 1 | 1 | 1 | 1 | 1 | 1 | 1 | 1 | 1 | 1 |
| | E | 0 | 1 | 1 | 1 | 1 | 1 | 1 | 1 | 1 | 1 | 1 | 1 | 1 | 1 | 1 | 1 |
| | F | 1 | 1 | 1 | 1 | 1 | 1 | 1 | 1 | 1 | 1 | 1 | 1 | 1 | 1 | 1 | 1 |

IMAGE FORMING APPARATUS AND IMAGE FORMING METHOD

BACKGROUND OF THE INVENTION

1. Field of the Invention

The present invention relates to an image forming apparatus that forms an image by irradiating the surface of a charged photosensitive material with a laser beam to form an electrostatic latent image and relates to a control method of the image forming apparatus.

2. Description of the Related Art

An image forming apparatus forming an image by electrophotography typically includes a charging unit that uniformly charges the photosensitive surface of the photosensitive drum. The image forming apparatus also includes a latent-image forming unit that forms a latent image corresponding to image information on the charged photosensitive surface, a developing unit that develops the latent image, and a transfer unit that transfers the developed latent image to a sheet of paper. The image forming apparatus sequentially performs image forming while rotating the photosensitive surface of the photosensitive drum.

The latent-image forming unit includes a semiconductor laser that outputs a laser beam resulting from light modulation of the input image information by a laser driver controller. The laser beam is reflected from a polygon mirror in the latent-image forming unit, and the reflected laser beam scans the photosensitive drum to form the latent image.

Such a semiconductor laser has a current-optical output characteristic shown in FIG. 14. The semiconductor laser emits light emitting diode (LED) light when the semiconductor laser is driven at a current Ib lower than a threshold current Ith, and emits a laser beam having an optical output Po when the semiconductor laser is driven at a current Io higher than the threshold current Ith. This current-optical output characteristic is varied with variation between semiconductor lasers and change in temperature.

Accordingly, the latent-image forming unit generally includes an automatic power control (APC) circuit that performs automatic power control (hereinafter referred to as APC) such that the semiconductor laser stably emits the laser beam without being affected by the change in temperature when the semiconductor laser forms the latent image on the photosensitive drum.

The latent-image forming unit further includes a pulse width modulation (PWM) circuit that generates a PWM signal to be supplied to the semiconductor laser in order to form a tone image on a transfer sheet of paper.

FIG. 15 is a graph showing the relationship between the pulse width of a PWM signal and the integrated value of optical outputs in PWM drive of the semiconductor laser. A line (1) shows the relationship between the pulse width of the PWM signal and the quantity of light when Ib=0 and bias APC for controlling the emission of the LED light is not performed, a line (2) shows the relationship when 0<Ib<Ith, and a line (3) shows the relationship when Ib=Ith.

In the case of Ib=0 (the line (1)), the semiconductor laser provides no response and the quantity of light is equal to zero when the pulse width of the PWM signal is less than 10%, the semiconductor laser starts to light up when the pulse width of the PWM signal is equal to 10%, the quantity of light linearly increases along with the increase of the pulse width of the PWM signal when the pulse width of the PWM signal is more than 10% and less than 90%, the quantity of light sharply increases when the pulse width of the PWM signal is more than 90%, and the quantity of light is saturated at 100%.

In the case of 0<Ib<Ith (the line (2)), the semiconductor laser provides no response and the quantity of light is equal to zero when the pulse width of the PWM signal is less than 5%, the semiconductor laser starts to light up when the pulse width of the PWM signal is equal to 5%, the quantity of light linearly increases along with the increase of the pulse width of the PWM signal when the pulse width of the PWM signal is more than 5% and less than 90%, the quantity of light sharply increases when the pulse width of the PWM signal is more than 90%, and the quantity of light is saturated at 100%.

In the case of Ib=Ith (the line (3)), the semiconductor laser provides no response and the quantity of light is equal to zero when the pulse width of the PWM signal is less than 5%, the semiconductor laser starts to light up when the pulse width of the PWM signal is equal to 5%, the quantity of light sharply increases along with the increase of the pulse width of the PWM signal, the quantity of light linearly increases along with the increase of the pulse width of the PWM signal when the pulse width of the PWM signal is more than 10% and less than 95%, the quantity of light sharply increases when the pulse width of the PWM signal is more than 95%, and the quantity of light is saturated at 100%.

As disclosed in Japanese Patent Laid-Open No. 7-294837, performing the bias APC for setting the bias current Ib increases the proportion of the linear area of the PWM characteristic to improve the quality of an output image.

However, it is not possible to establish a linear relationship between the pulse width of the PWM signal and the quantity of light in the pulse width from 0% to 100% even in such a PWM circuit in the related art, and dead-band zones appear in areas near a pulse with of 0% and near a pulse width of 100%. Increasing the resolution of the pulse width of the PWM signal and finely controlling an area near 10% where the quantity of light sharply increase and an area near 90% where the quantity of light is toward the saturation in order to avoid the dead-band zone increases the number of input bits in the PWM circuit and the PWM circuit becomes complicated. For example, since it is said that the number of levels of the density gradation which a human being can perceive is about ten in an image having a resolution of 600 dpi, it is sufficient to provide 4-bit density data for an image. However, in order to increase the resolution of the pulse width of the PWM signal for fine control of the semiconductor laser, it is necessary to provide 8-bit density data. Accordingly, there is a problem in that the cost is increased because the number of bits in an image controller that processes image data is unnecessarily increased.

The dead-band zone of the semiconductor laser is determined by the characteristics of the semiconductor laser and the characteristic of a driving circuit therein. With the same semiconductor laser and the driving circuit being used, the proportion of the dead-band zone is increased with an increase of the drive frequency and the linear area is reduced, thus degrading the controllability. For example, a semiconductor laser having the dead-band zone below a pulse width of 5% at a drive frequency of 10 MHz has the dead-band zone below a pulse width of 10% at a drive frequency of 20 MHz.

The tone reproducibility in a lower density area near a pulse width of 0% and in a higher density area near a pulse width of 100% is reduced as the drive frequency of the semiconductor laser is increased along with an increasing need for high-speed processing and for higher image quality of output images and, therefore, the improvement of the image quality of the output images is inhibited.

SUMMARY OF THE INVENTION

The present invention is directed to an image forming apparatus and a control method of the image forming apparatus which are capable of preventing degradation of the image quality to form an image with a higher quality while suppressing an increase in cost.

According to one aspect of the present invention, an image forming apparatus operable to generate a PWM signal corresponding to input image data and to control a timing of a light source to emit a light beam based on the PWM signal in order to perform tone reproduction includes a data processing unit configured to generate the PWM signal for one pixel based on image data for continuous two pixels in the image data. The data processing unit selects an origin of pulse growth in generation of the PWM signal for one pixel in accordance with the image data for the two pixels to generate the PWM signal.

According to another aspect of the present invention, an electrophotographic image forming apparatus includes a photosensitive material; a light source exposing a printed image on the photosensitive material; a driving unit blinking and driving the light source; a generating unit configured to generate a multi-valued image signal including continuous n-number pieces of first pixel data by image processing; a data outputting unit configured to output data corresponding to the multi-valued image signal generated by the generating unit; and a converting unit configured to convert the output data into a pulse width signal including continuous m-number pieces of second pixel data via a predetermined pulse growth method. The driving unit blinks and drives the light source based on the pulse width signal. A ratio of a resolution between the generated multi-valued image signal and the exposed printed image is n:m, and n>m (n and m are natural numbers).

According to yet another aspect of the present invention, an image forming method of an electrophotographic image forming apparatus including a photosensitive material and a light source exposing a printed image on the photosensitive material includes the steps of blinking and driving the light source; generating a multi-valued image signal including continuous n-number pieces of first pixel data by image processing; outputting data corresponding to the multi-valued image signal generated in the generating step; and converting the output data into a pulse width signal including continuous m-number pieces of second pixel data by a predetermined pulse growth method. The blinking and driving step includes blinking and driving of the light source based on the pulse width signal. A ratio of a resolution between the generated multi-valued image signal and the exposed printed image is n:m, and n>m (n and m are natural numbers).

The above characteristics are achieved by combinations of the characteristics described in the independent claims, and the dependent claims define examples of the present invention.

Summary of the Invention does not enumerate all the required characteristics and, therefore, combinations of these characteristics can constitute the present invention.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a schematic plane view illustrating the structure of an electrophotographic image forming apparatus according to an embodiment of the present invention.

FIG. 2 is a schematic side view illustrating the structure of the electrophotographic image forming apparatus according to the embodiment of the present invention.

FIG. 4 is a circuit diagram of a PWM circuit in the laser driver controller shown in FIG. 3.

FIGS. 5A-B illustrate a PWM signal output from the PWM circuit shown in FIG. 4.

FIGS. 11A-B illustrate a PWM signal output from a PWM circuit in the laser driver controller in FIG. 10.

FIGS. 12A-B illustrate a PWM signal output from a PWM circuit in a laser driver controller according to a fourth modification.

FIG. 17 shows the structure of a pulse width table according to the embodiment, the first modification, and the second modification.

FIG. 19 shows the structure of a pulse growth table according to the first modification.

FIG. 21 shows the structure of a pulse growth table according to the second modification.

FIG. 24 shows the structure of a pulse width table according to the third modification and the fourth modification.

DESCRIPTION OF THE EMBODIMENTS

Figure 3:
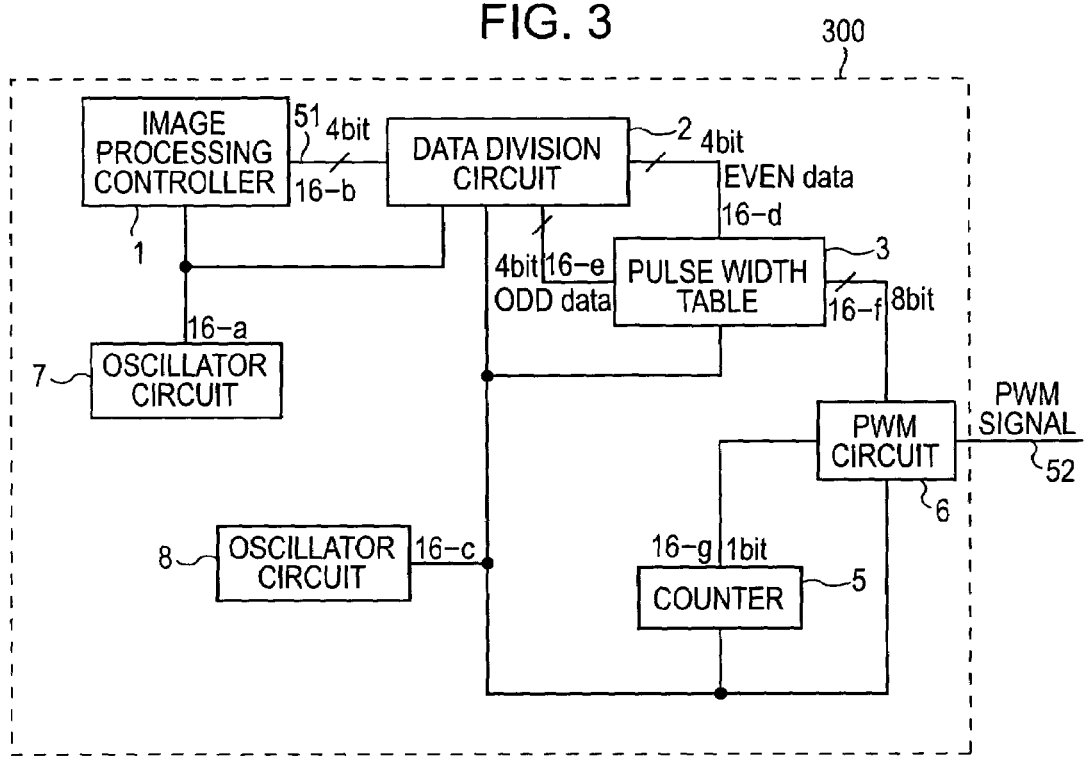
FIG. 3 is a block diagram schematically showing the structure of a laser driver controller driving a semiconductor laser shown in FIGS. 1 and 2.

Embodiments of the present invention will be described in detail with reference to the attached drawings. The embodiments are not intended to limit the invention described in the claims, and all the combinations of characteristics described in the embodiments are not necessarily essential. Although an image forming apparatus having one photosensitive drum is described in the following embodiments, the present invention is not limited to the image forming apparatus having one photosensitive drum. For example, the image forming apparatus may be structured such that a plurality of image forming units for Y (yellow), M (magenta), C (cyan), and Bk (black) colors are arranged along the direction of feeding recording paper.

FIG. 1 is a schematic plane view illustrating the structure of an electrophotographic image forming apparatus according to an embodiment of the present invention. FIG. 2 is a side view of the electrophotographic image forming apparatus.

In the image forming apparatus, a laser irradiation unit 100, which is a latent-image forming unit, includes a semiconductor laser 17. The semiconductor laser 17 outputs a laser beam resulting from light modulation of input image information by a laser driver controller 300 described below with reference to FIG. 3. The laser irradiation unit 100 also includes a collimator lens 20 collimating the laser beam emitted from the semiconductor laser 17 and a polygon mirror 15 reflecting the laser beam collimated by the collimator lens 20 to provide a polarization beam that continuously varies the angle. The laser irradiation unit 100 further includes a laser scanner motor 16 rotating and driving the polygon mirror 15 in the direction shown by an arrow in FIG. 1; an f-θ lens 21 that, for example, corrects distortion of the laser beam reflected by the polygon mirror 15; a reflecting mirror 18 reflecting the laser beam supplied through the f-θ lens 21 such that scanning is performed with laser beam on a photosensitive drum 10; and a beam detect (BD) sensor 19 provided near the starting position of scanning with the laser beam at the side of the photosensitive drum 10. The laser irradiation unit 100 having the structure described above reflects the laser beam by using the polygon mirror 15, and the reflected laser beam scans the photosensitive drum 10 to form an electrostatic latent image.

The image forming apparatus includes a developing unit 12 developing the latent image to provide a visible image, a transfer charger unit 13 transferring the developed visible image to a transfer material (not shown), and a fixing unit 14 fixing the transferred visible image, in addition to the laser irradiation unit 100 and the photosensitive drum 10.

Scanning of one line on each reflecting surface of the polygon mirror 15 corresponds to scanning of one line in the main scanning direction of the photosensitive drum 10.

The BD sensor 19 detects the laser beam reflected from each reflecting surface of the polygon mirror 15 prior to the scanning in the main scanning direction and outputs a BD signal. The output BD signal is supplied to a timing controller (not shown) as a reference signal for starting the scanning in the main scanning direction. The timing controller synchronizes the write starting positions of lines in the main scanning direction with each other based on the reference signal.

FIG. 3 is a block diagram schematically showing the structure of the laser driver controller 300 driving the semiconductor laser 17 shown in FIGS. 1 and 2.

The laser driver controller 300 includes an oscillator circuit 7, an oscillator circuit 8, an image processing controller 1, a data division circuit 2, a pulse width table 3, a PWM circuit 6, and a counter 5. The oscillator circuit 7 generates a read clock. The oscillator circuit 8 generates a write clock. The image processing controller 1, which is a generating unit, outputs image data 51 (shown in FIG. 5A), which is 4-bit pixel data in synchronization with the read clock supplied from the oscillator circuit 7. The data division circuit 2, which includes a first-in first-out (FIFO) memory, sequentially stores the image data 51 supplied from the image processing controller 1 in synchronization with the write clock generated by the oscillator circuit 8 and divides the image data 51 into odd-numbered data (ODD data), which is odd-numbered pixel data, and even-numbered data (EVEN data), which is even-numbered pixel data, to supply the odd-numbered and even-numbered data to the pulse width table 3. The pulse width table 3, which is a data outputting unit, is a table having 8-bit addresses and 8-bit data, and transmits pulse width data indicating the pulse width corresponding to the odd-numbered data and the even-numbered data supplied from the data division circuit 2 to the PWM circuit 6. The counter 5 counts the write clock generated by the oscillator circuit 8 and supplies a 1-bit signal indicating an odd number or an even number of the write clock to the PWM circuit 6. The PWM circuit 6 (shown in FIG. 4) serves as a converting unit for generating a PWM signal to be supplied to the semiconductor laser 17. The counter 5 supplies a mode selection signal resulting from frequency dividing of the write clock generated by the oscillator circuit 8 to the PWM circuit 6.

The frequencies of the read clock generated by the oscillator circuit 7 and the write clock generated by the oscillator circuit 8 are set such that the data in the FIFO memory included in the data division circuit 2 does not cause overflow or underflow during the scanning of one line.

FIG. 4 is a circuit diagram of the PWM circuit 6 in the laser driver controller 300 shown in FIG. 3.

Referring to FIG. 4, the PWM circuit 6 includes a register 601, a digital-analog (D/A) converter circuit 602, a triangular-wave generator circuit 604, an EX-OR gate 605, a comparator 603, and a buffer 606. The register 601 synchronizes the pulse width data, which is an 8-bit parallel signal supplied from the pulse width table 3, with the write clock generated by the oscillator circuit 8 to output the synchronized signal. The D/A converter circuit 602 converts the output signal from the register 601 into an analog voltage. The triangular-wave generator circuit 604 receives the write clock generated by the oscillator circuit 8 to generate a triangular wave having the frequency of the write clock. The EX-OR gate 605 receives the triangular wave generated by the triangular-wave generator circuit 604 and the mode selection signal generated by the counter 5. The comparator 603 compares the output signal from the D/A converter circuit 602 with the output signal from the EX-OR gate 605 to output a PWM signal 52 (FIG. 5B) described below. The buffer 606 supplies the PWM signal 52 received from the comparator 603 to the semiconductor laser 17 through a laser diode driving circuit (not shown), which is a driving unit.

Figure 16:
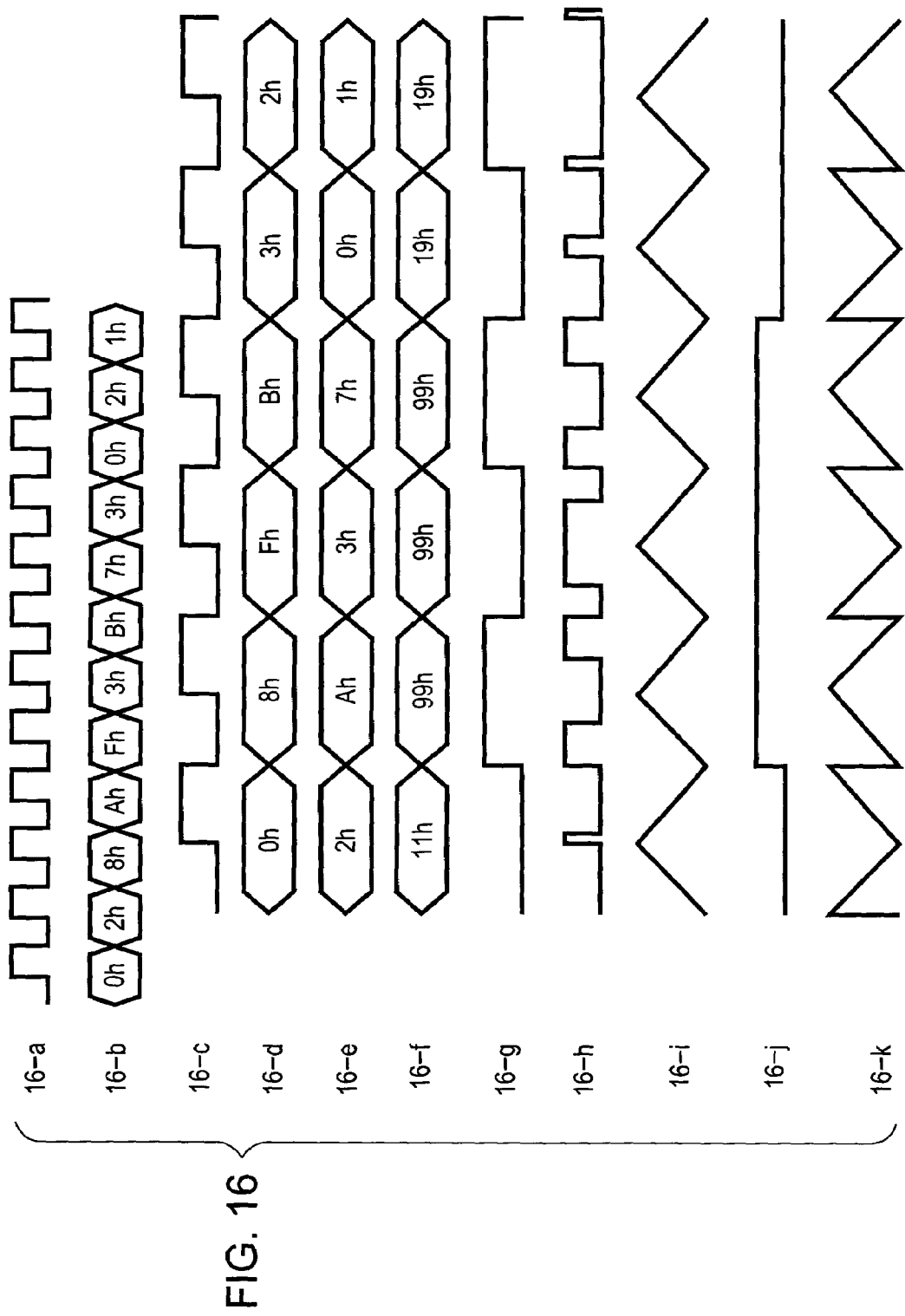
FIG. 16 is a timing chart illustrating the operation of the laser driver controller according to the embodiment.

FIG. 16 is a timing chart illustrating the operation of the laser driver controller 300 according to this embodiment. Reference numeral and symbol 16-a denote an output waveform of the read clock generated by the oscillator circuit 7. Reference numeral and symbol 16-b denote the 4-bit pixel data output from the image processing controller 1. The 4-bit pixel data is supplied to the data division circuit 2 in synchronization with the read clock generated by the oscillator circuit 7. Reference numeral and symbol 16-c denote an output waveform of the write clock generated by the oscillator circuit 8. Reference numerals and symbols 16-d and 16-e denote the odd-numbered data and the even-numbered data of the pixel data, respectively, and are supplied to the pulse width table 3 in synchronization with the write clock generated by the oscillator circuit 8.

FIG. 17 shows the structure of the pulse width table 3. The pulse width table 3 has 4-bit even-numbered data and 4-bit odd-numbered data as addresses. Eight-bit data stored at the addresses are output from the pulse width table 3. This 8-bit data is denoted by 16-f in FIG. 16. Referring back to FIG. 16, reference numeral and symbol 16-g denote the mode selection signal resulting from the frequency dividing of the write clock generated by the oscillator circuit 8 in the counter 5. Reference numeral and symbol 16-i denote the triangular wave generated by the triangular-wave generator circuit 604. Reference numeral and symbol 16-j denote an output waveform from the D/A converter circuit 602 converting the 8-bit data received from the pulse width table 3 into the analog voltage. Reference numeral and symbol 16-k denote an output from the EX-OR gate 605. The EX-OR gate 605 outputs an inverted waveform of the triangular wave generated by the triangular-wave generator circuit 604 when the mode selection signal denoted by 16-g is low (Lo), and outputs a normal waveform of the triangular wave generated by the triangular-wave generator circuit 604 when the mode selection signal denoted by 16-g is high (Hi). The comparator 603 compares the output 16-j from the D/A converter circuit 602 with the output 16-k from the EX-OR gate 605. The signal in the high level (Hi) is output from the comparator 603 when the output from the D/A converter circuit 602 is higher than the output from the EX-OR gate 605, and the signal in the low level (Lo) is output from the comparator 603 when the output from the EX-OR gate 605 is higher than the output from the D/A converter circuit 602. Reference numeral and symbol 16-h denote this waveform output from the comparator 603.

FIGS. 5A-B illustrate the PWM signal output from the PWM circuit 6 shown in FIG. 4. The PWM signal 52 (FIG. 5B) is associated with the image data 51 (FIG. 5A) output from the image processing controller 1. The PWM signal 52 is output from the PWM circuit 6. The image data 51 includes continuous 4-bit pixel data, which is first pixel data, that is, 0H, 2H, 8H, AH, FH, 3H, BH, 7H, 3H, OH, 2H, and 1H. This pixel data is divided into the odd-numbered data and the even-numbered data by the data division circuit 2. Eight-bit address data generated by pairing the odd-numbered data with the even-numbered data in synchronization with the write clock supplied from the oscillator circuit 8 is stored in the pulse width table 3. The 8-bit pulse width data corresponding to the address data is supplied to the PWM circuit 6. The PWM circuit 6 generates and outputs the PWM signal 52 in response to the 1-bit signal supplied from the counter 5 to the PWM circuit 6. In the PWM signal 52, odd-numbered pulses are represented by a central growth method in which the pulse growth is originated from the center of the pixel, and even-numbered pulses are represented by a left-and-right growth method in which the pulse growth is originated from left and right ends of the pixel. The PWM signal 52 includes pixel data 11H, 99H, 99H, 99H, 19H, and 19H having the same pulse width as that of the pulse width data as second pixel data supplied from the pulse width table 3.

On the assumption that the image data 51 includes n pieces of pixel data and the PWM signal 52 includes m pieces of pixel data (n and m denote natural numbers), the ratio of resolution between the image data 51 and the PWM signal 52 is n:m and n>m.

In the laser driver controller 300 shown in FIG. 3, the PWM circuit 6 generates and outputs the PWM signal 52, in which the odd-numbered pulses are represented by the central growth method and the even-numbered pulses are represented by the left-and-right growth method and which includes the pixel data having the same pulse width as that of the pulse width data supplied from the pulse width table 3. Since the ratio of resolution between the image data 51 and the PWM signal 52 is n:m and n>m, the frequency of the PWM signal 52 is prevented from increasing because of the lower frequency of the PWM signal 52. When the pixel data generated by adding the odd-numbered data to the even-numbered data is represented only by the central growth method, a left growth method, or a right growth method, the resolution is halved. In contrast, since the odd-numbered pulses are represented by the central growth method and the even-numbered pulses are represented by the left-and-right growth method in the embodiment of the present invention, it is possible to maintain a minimum resolution. Accordingly, if the resolution is increased in order to increase the image quality, the tone reproducibility of a printed image is not largely degraded and the deterioration in image quality is inhibited. Since predetermined pulse growth methods include the central growth method and the left-and-right growth method, a reduction in the tone reproducibility of the printed image is inhibited.

Although the odd-numbered pulses are represented by the central growth method and the even-numbered pulses area represented by the left-and-right growth method, the even-numbered pulses may be represented by the central growth method and the odd-numbered pulses may be represented by the left-and-right growth method.

Figure 6:
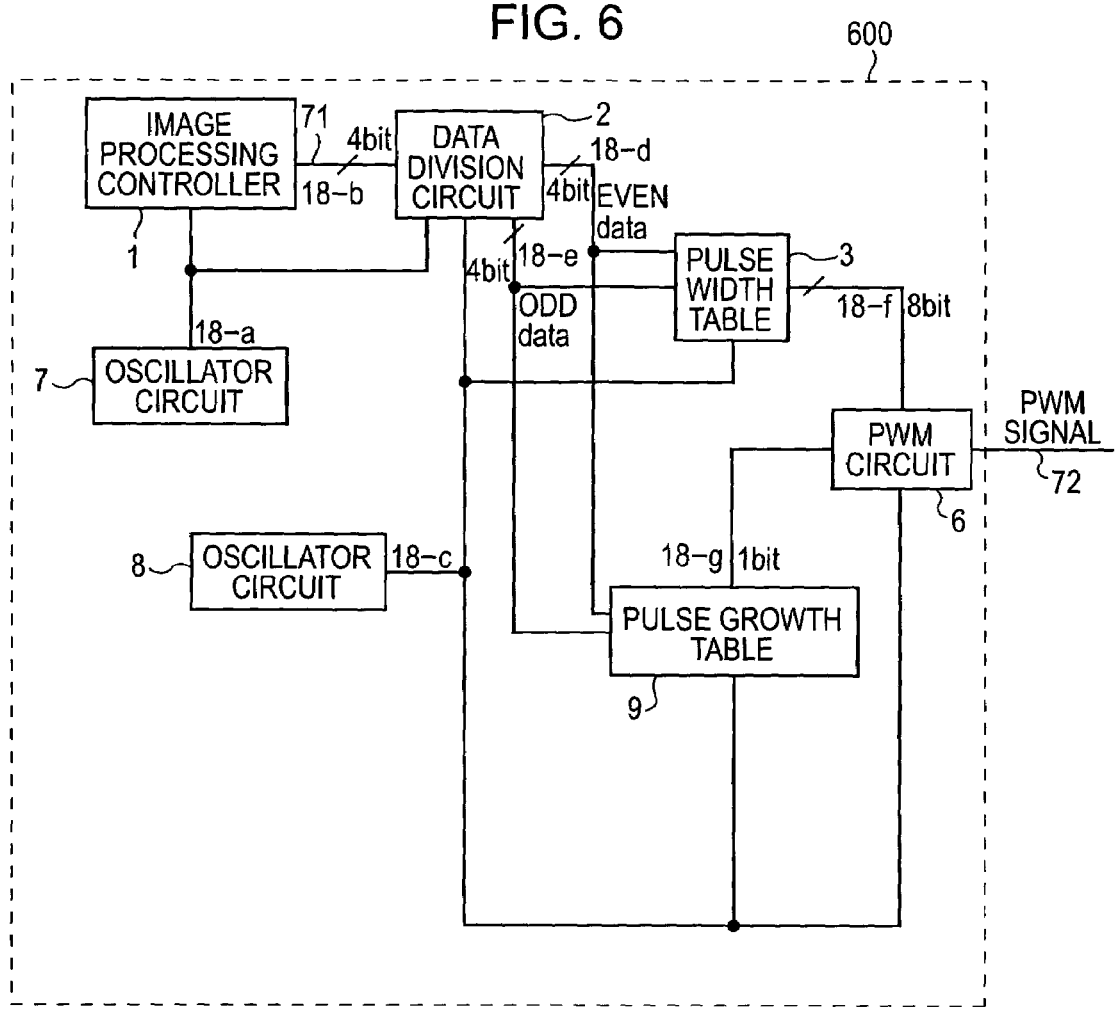
FIG. 6 is a block diagram schematically showing the structure of a laser driver controller according to a first modification.

FIG. 6 is a block diagram schematically showing the structure of a laser driver controller 600 according to a first modification of the laser driver controller 300 in FIG. 3. The laser driver controller 600 in FIG. 6 basically has the same structure as that of the laser driver controller 300 in FIG. 3. The same reference numerals are used in FIG. 6 to identify the same components shown in FIG. 3. A duplicated description of such components is omitted herein and only components different from those in FIG. 3 are described below.

Referring to FIG. 6, the laser driver controller 600 includes a pulse growth table 9, instead of the counter 5 in FIG. 3. The pulse growth table 9 has a table including 8-bit addresses and 1-bit data. The input odd-numbered data is paired with the input even-numbered data, and the paired data is stored in the pulse growth table 9. The pulse growth table 9 presumes the paired data as 8-bit address and transmits 1-bit data corresponding to the address in this table to the PWM circuit 6.

Figure 18:
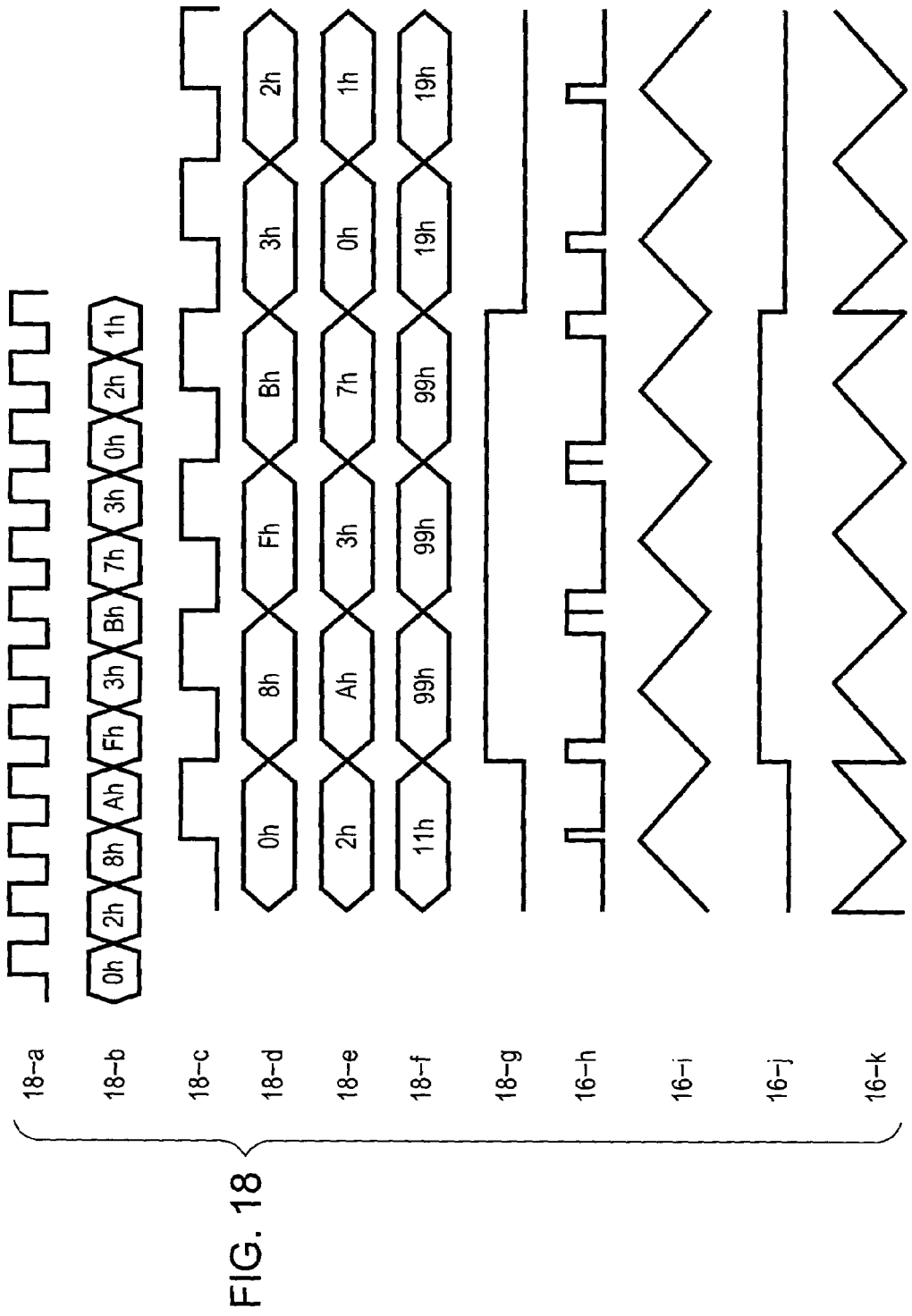
FIG. 18 is a timing chart illustrating the operation of the laser driver controller according to the first modification.

FIG. 18 is a timing chart illustrating the operation of the laser driver controller 600 according to the first modification. Reference numeral and symbol 18-a denote an output waveform of the read clock generated by the oscillator circuit 7. Reference numeral and symbol 18-b denote the 4-bit pixel data output from the image processing controller 1. The 4-bit pixel data is supplied to the data division circuit 2 in synchronization with the read clock generated by the oscillator circuit 7. Reference numeral and symbol 18-c denote an output waveform of the write clock generated by the oscillator circuit 8. Reference numerals and symbols 18-d and 18-e denote the odd-numbered data and the even-numbered data of the pixel data, respectively, and are supplied to the pulse width table 3 in synchronization with the write clock generated by the oscillator circuit 8.

FIG. 17 shows the structure of the pulse width table 3. The pulse width table 3 has 4-bit even-numbered data and 4-bit odd-numbered data as addresses. Eight-bit data stored at the addresses are output from the pulse width table 3. This 8-bit data is denoted by 18-f in FIG. 18. Referring back to FIG. 18, reference numeral and symbol 18-g denote the signal output from the pulse growth table 9.

FIG. 19 shows the structure of the pulse growth table 9. The pulse growth table 9 has 4-bit even-numbered data and 4-bit odd-numbered data as addresses. One-bit mode selection data stored at the addresses is output from the pulse growth table 9. Reference numeral and symbol 16-i denote the triangular wave generated by the triangular-wave generator circuit 604. Reference numeral and symbol 16-j denote an output waveform from the D/A converter circuit 602 converting the 8-bit data received from the pulse width table 3 into the analog voltage. Reference numeral and symbol 16-*k* denote an output from the EX-OR gate 605. The EX-OR gate 605 outputs an inverted waveform of the triangular wave generated by the triangular-wave generator circuit 604 when the mode selection signal denoted by 18-*g* is low (Lo), and outputs a normal waveform of the triangular wave generated by the triangular-wave generator circuit 604 when the mode selection signal denoted by 18-*g* is high (Hi). The comparator 603 compares the output 16-*j* from the D/A converter circuit 602 with the output 16-*k* from the EX-OR gate 605. The signal in the high level (Hi) is output from the comparator 603 when the output from the D/A converter circuit 602 is higher than the output from the EX-OR gate 605, and the signal in the low level (Lo) is output from the comparator 603 when the output from the EX-OR gate 605 is higher than the output from the D/A converter circuit 602. Reference numeral and symbol 16-*h* denote this waveform output from the comparator 603.

Figures 7A, 7B:
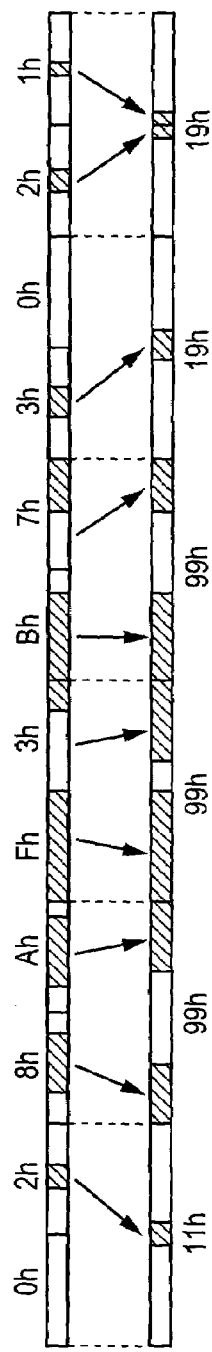
FIGS. 7A-B illustrate a PWM signal output from a PWM circuit in the laser driver controller in FIG. 6.

FIGS. 7A-B illustrate the PWM signal output from the PWM circuit 6 shown in FIG. 6. A PWM signal 72 (FIG. 7B) is associated with image data 71 (FIG. 7A) output from the image processing controller 1. The PWM signal 72 is output from the PWM circuit 6. The image data 71 includes continuous 4-bit pixel data 0H, 2H, 8H, AH, FH, 3H, BH, 7H, 3H, 0H, 2H, and 1H. This pixel data is divided into the odd-numbered data and the even-numbered data by the data division circuit 2. Eight-bit address data generated by pairing the odd-numbered data with the even-numbered data in synchronization with the write clock supplied from the oscillator circuit 8 is stored in the pulse width table 3. The 8-bit pulse width data corresponding to the address data is supplied to the PWM circuit 6. The PWM circuit 6 generates and outputs the PWM signal 72 in response to the 1-bit signal supplied from the pulse growth table 9 to the PWM circuit 6. In the PWM signal 72, pulses having a pulse width of less than 80H are represented by the central growth method, pulses having a pulse width of not less than 80H are represented by the left-and-right growth method, and pulses having a pulse width of 80H are represented by the central growth method or the left-and-right growth method, which is determined in advance. The PWM signal 72 includes pixel data 11H, 99H, 99H, 99H, 19H, and 19H having the same pulse width as that of the pulse width data supplied from the pulse width table 3.

In the laser driver controller 600 shown in FIG. 6, the PWM circuit 6 generates and outputs the PWM signal 72, in which the pulses having a pulse width of less than 80H are represented by the central growth method, the pulses having a pulse width of more than 80H are represented by the left-and-right growth method, and the pulses having a pulse width of 80H are represented by the central growth method or the left-and-right growth method, which is determined in advance. The PWM signal 72 includes the pixel data having the same pulse width as that of the pulse width data supplied from the pulse width table 3. Accordingly, even when each of the odd-numbered data and the even-numbered data in the image data 71 forms a dead-band zone as the pulse width of the PWM signal, one pixel is represented as the pixel data having the pulse width represented by the central growth method based on the odd-numbered data and the even-numbered data. Hence, improving the tone reproducibility of the printed image in a lower density area improves the image quality of the lower density area. Since the origin of the pulse growth is determined from the pixel data, it is possible to prevent a decrease in the tone reproducibility of the printed image to generate the printed image with the original density data being maintained.

Figure 8:
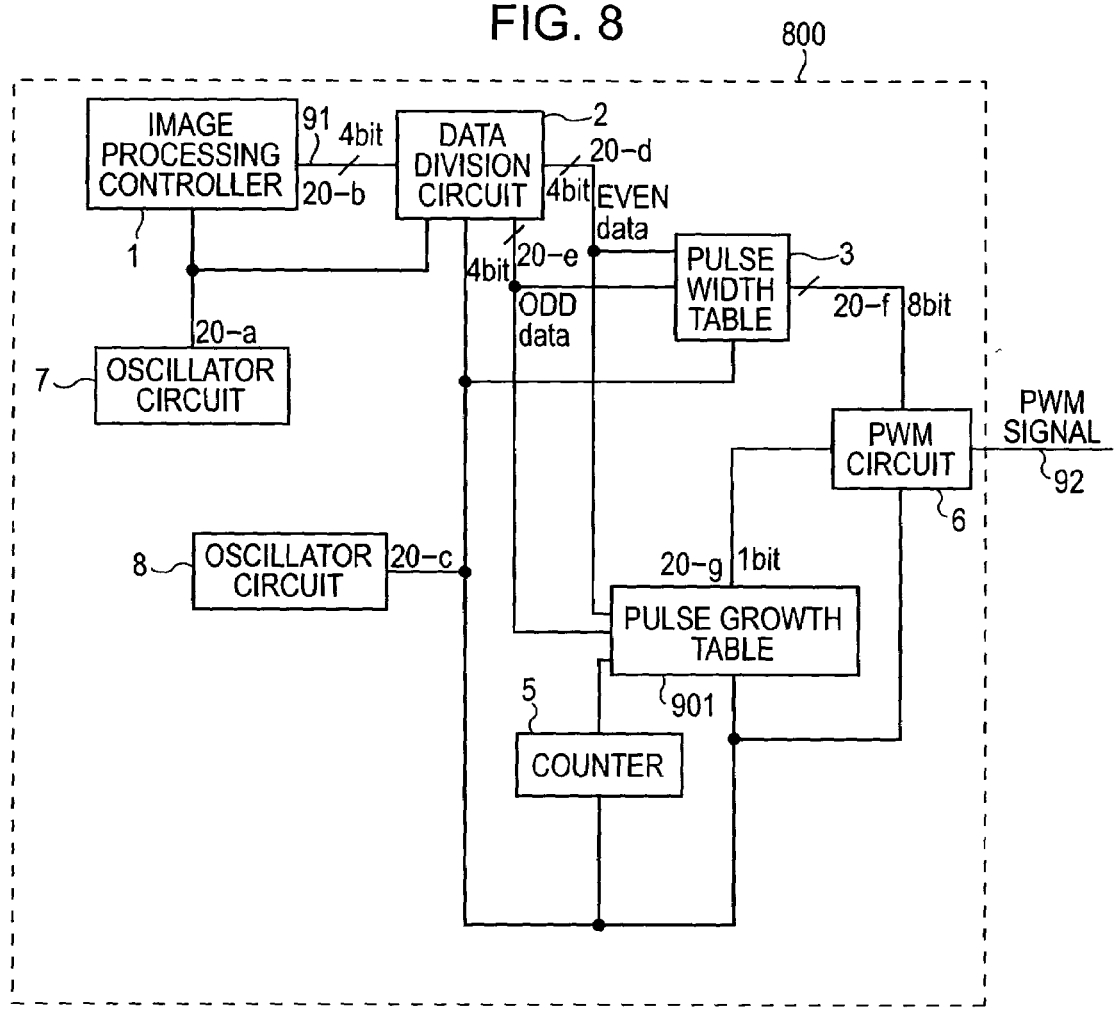
FIG. 8 is a block diagram schematically showing the structure of a laser driver controller according to a second modification.

FIG. 8 is a block diagram schematically showing the structure of a laser driver controller 800 according to a second modification of the laser driver controller 300 in FIG. 3. The laser driver controller 800 in FIG. 8 basically has the same structure as that of the laser driver controller 300 in FIG. 3. The same reference numerals are used in FIG. 8 to identify the same components shown in FIG. 3. A duplicated description of such components is omitted herein and only components different from those in FIG. 3 are described below.

Referring to FIG. 8, the laser driver controller 800 includes a pulse growth table 901, in addition to the components in the laser driver controller 300 in FIG. 3. The pulse growth table 901 is provided in parallel to the pulse width table 3 and is connected to the counter 5. The pulse growth table 901 has a table including 8-bit addresses and 1-bit data. The input odd-numbered data is paired with the input even-numbered data and the paired data is stored in the pulse growth table 901. The pulse growth table 901 presumes the paired data as 8-bit address and transmits 1-bit data corresponding to the address in this table to the PWM circuit 6.

Figure 20:
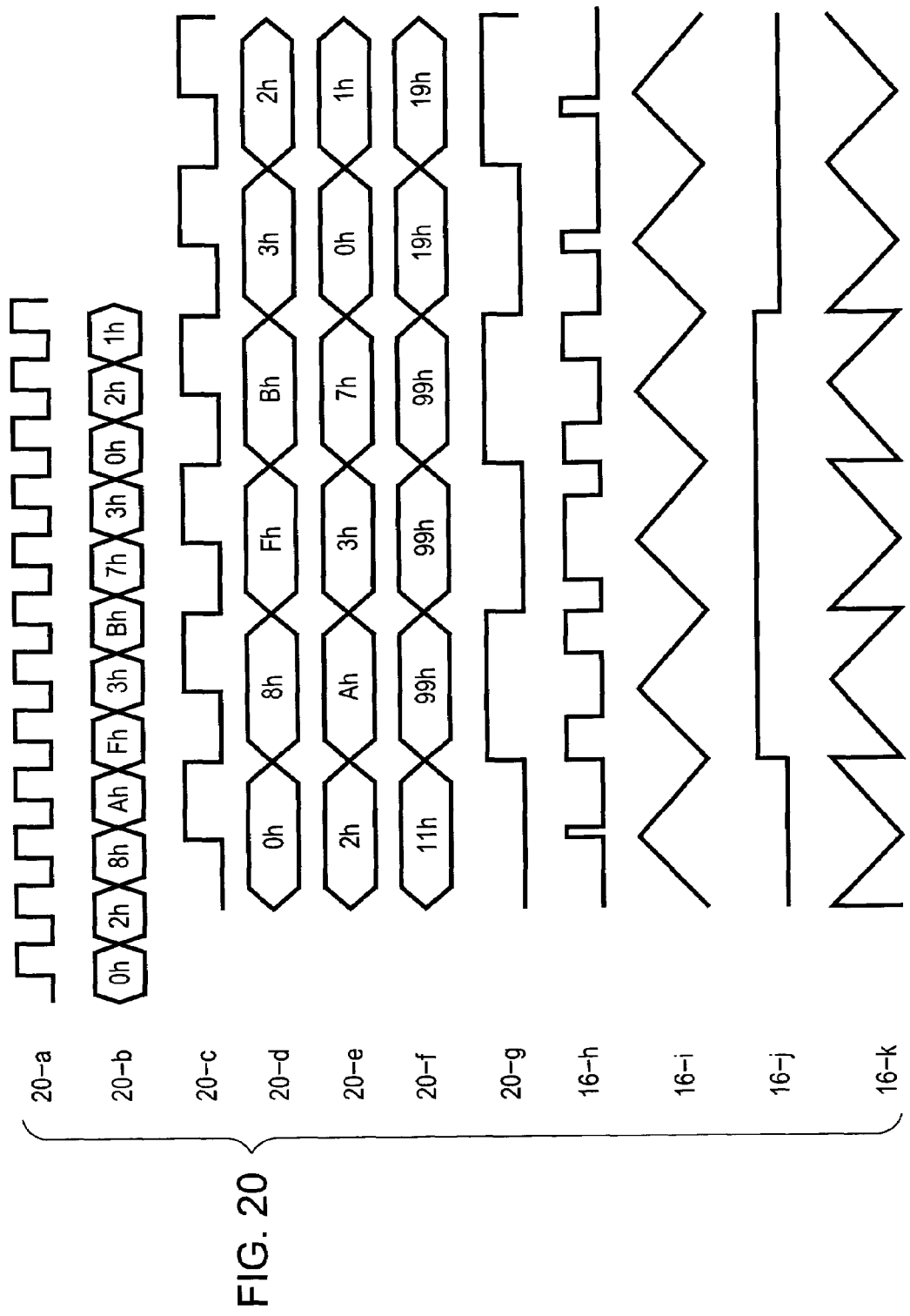
FIG. 20 is a timing chart illustrating the operation of the laser driver controller according to the second modification.

FIG. 20 is a timing chart illustrating the operation of the laser driver controller 800 according to the second modification. Reference numeral and symbol 20-*a* denote an output waveform of the read clock generated by the oscillator circuit 7. Reference numeral and symbol 20-*b* denote the 4-bit pixel data output from the image processing controller 1. The 4-bit pixel data is supplied to the data division circuit 2 in synchronization with the read clock generated by the oscillator circuit 7. Reference numeral and symbol 20-*c* denote an output waveform of the write clock generated by the oscillator circuit 8. Reference numerals and symbols 20-*d* and 20-*e* denote the odd-numbered data and the even-numbered data of the pixel data, respectively, and are supplied to the pulse width table 3 in synchronization with the write clock generated by the oscillator circuit 8.

Figure 21:
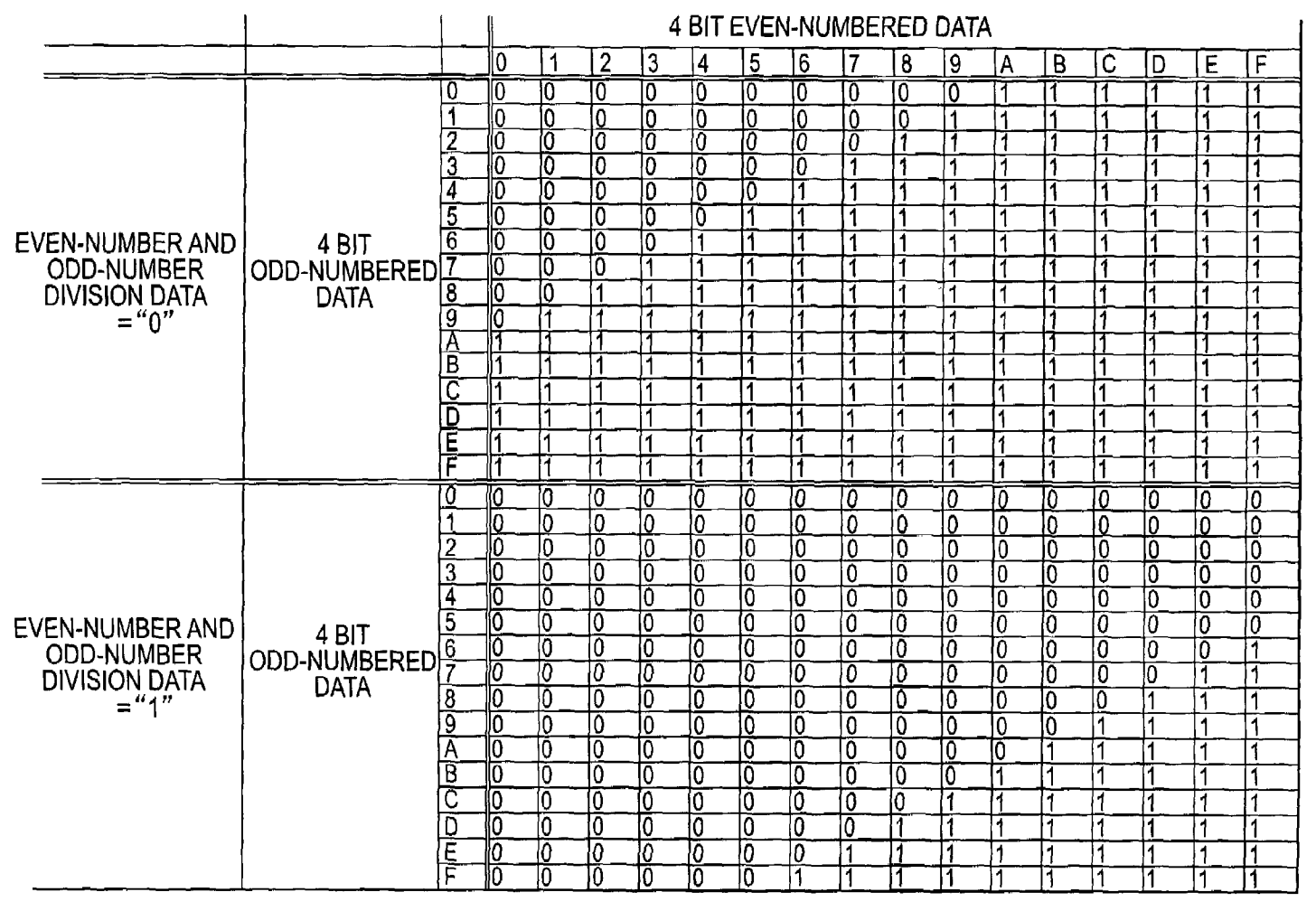

FIG. 17 shows the structure of the pulse width table 3. The pulse width table 3 has 4-bit even-numbered data and 4-bit odd-numbered data as addresses. Eight-bit data stored at the addresses are output from the pulse width table 3. This 8-bit data is denoted by 20-*f* in FIG. 20. Referring back to FIG. 20, reference numeral and symbol 20-*g* denote the signal output from the pulse growth table 901. FIG. 21 shows the structure of the pulse growth table 901. The pulse growth table 901 has 4-bit even-numbered data, 4-bit odd-numbered data, and even-number and odd-number division data supplied from the counter 5 as addresses. One-bit mode selection data stored at the addresses is output from the pulse growth table 901. Reference numeral and symbol 16-*i* denote the triangular wave generated by the triangular-wave generator circuit 604. Reference numeral and symbol 16-*j* denote an output waveform from the D/A converter circuit 602 converting the 8-bit data received from the pulse width table 3 into the analog voltage. Reference numeral and symbol 16-*k* denote an output from the EX-OR gate 605. The EX-OR gate 605 outputs an inverted waveform of the triangular wave generated by the triangular-wave generator circuit 604 when the mode selection signal denoted by 20-*g* is low (Lo), and outputs a normal waveform of the triangular wave generated by the triangular-wave generator circuit 604 when the mode selection signal denoted by 20-*g* is high (Hi). The comparator 603 compares the output 16-*j* from the D/A converter circuit 602 with the output 16-*k* from the EX-OR gate 605. The signal in the high level (Hi) is output from the comparator 603 when the output from the D/A converter circuit 602 is higher than the output from the EX-OR gate 605, and the signal in the low level (Lo) is output from the comparator 603 when the output from the EX-OR gate 605 is higher than the output from the D/A converter circuit 602. Reference numeral and symbol 16-*h* denote this waveform output from the comparator 603.

Figure 9:
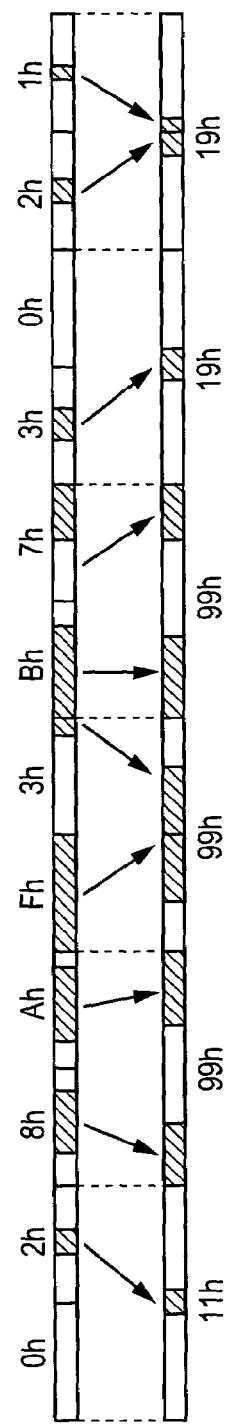
FIGS. 9A-B illustrate a PWM signal output from a PWM circuit in the laser driver controller in FIG. 8.

FIGS. 9A-B illustrate the PWM signal output from the PWM circuit 6 shown in FIG. 8. A PWM signal 92 (FIG. 9B) is associated with image data 91 (FIG. 9A) output from the image processing controller 1. The PWM signal 92 is output from the PWM circuit 6.

The image data 91 includes continuous 4-bit pixel data 0H, 2H, 8H, AH, FH, 3H, BH, 7H, 3H, 0H, 2H, and 1H. This pixel data is divided into the odd-numbered data and the even-numbered data by the data division circuit 2. Eight-bit address data generated by pairing the odd-numbered data with the even-numbered data in synchronization with the write clock supplied from the oscillator circuit 8 is stored in the pulse width table 3. The 8-bit pulse width data corresponding to the address data is supplied to the PWM circuit 6. The PWM circuit 6 generates and outputs the PWM signal 92 in response to the 1-bit signal supplied from the pulse growth table 901 to the PWM circuit 6. In the PWM signal 92, pulses having a pulse width of less than 50H are represented by the central growth method, pulses having a pulse width of more than B0H are represented by the left-and-right growth method, odd-numbered pulses having a pulse width of more than 50H and less than B0H are represented by the central growth method, and even-numbered pulses having a pulse width of more than 50H and less than B0H are represented by the left-and-right growth method. Pulses having a pulse width of 50H and pulses having a pulse width of B0H are represented by the central growth method or the left-and-right growth method, which is determined in advance. The PWM signal 92 includes pixel data 11H, 99H, 99H, 99H, 19H, and 19H having the same pulse width as that of the pulse width data supplied from the pulse width table 3.

In the laser driver controller 800 shown in FIG. 8, the PWM circuit 6 generates and outputs the PWM signal 92, in which pulses having a pulse width of less than 50H are represented by the central growth method, pulses having a pulse width of more than B0H are represented by the left-and-right growth method, odd-numbered pulses having a pulse width of more than 50H and less than B0H are represented by the central growth method, even-numbered pulses having a pulse width of more than 50H and less than B0H are represented by the left-and-right growth method, and pulses having a pulse width of 50H and pulses having a pulse width of B0H are represented by the central growth method or the left-and-right growth method, which is determined in advance. The PWM signal 92 includes the pixel data having the same pulse width as that of the pulse width data supplied from the pulse width table 3. Since one pixel is represented as the pixel data having the pulse width represented by the central growth method based on the odd-numbered data and the even-numbered data, improving the tone reproducibility of the printed image in a lower density area improves the image quality of the lower density area. Furthermore, since the central growth method and the left-and-right growth method are alternately repeated when the pixel data having intermediate densities is continuously provided, a reduction in the resolution is inhibited.

Figure 10:
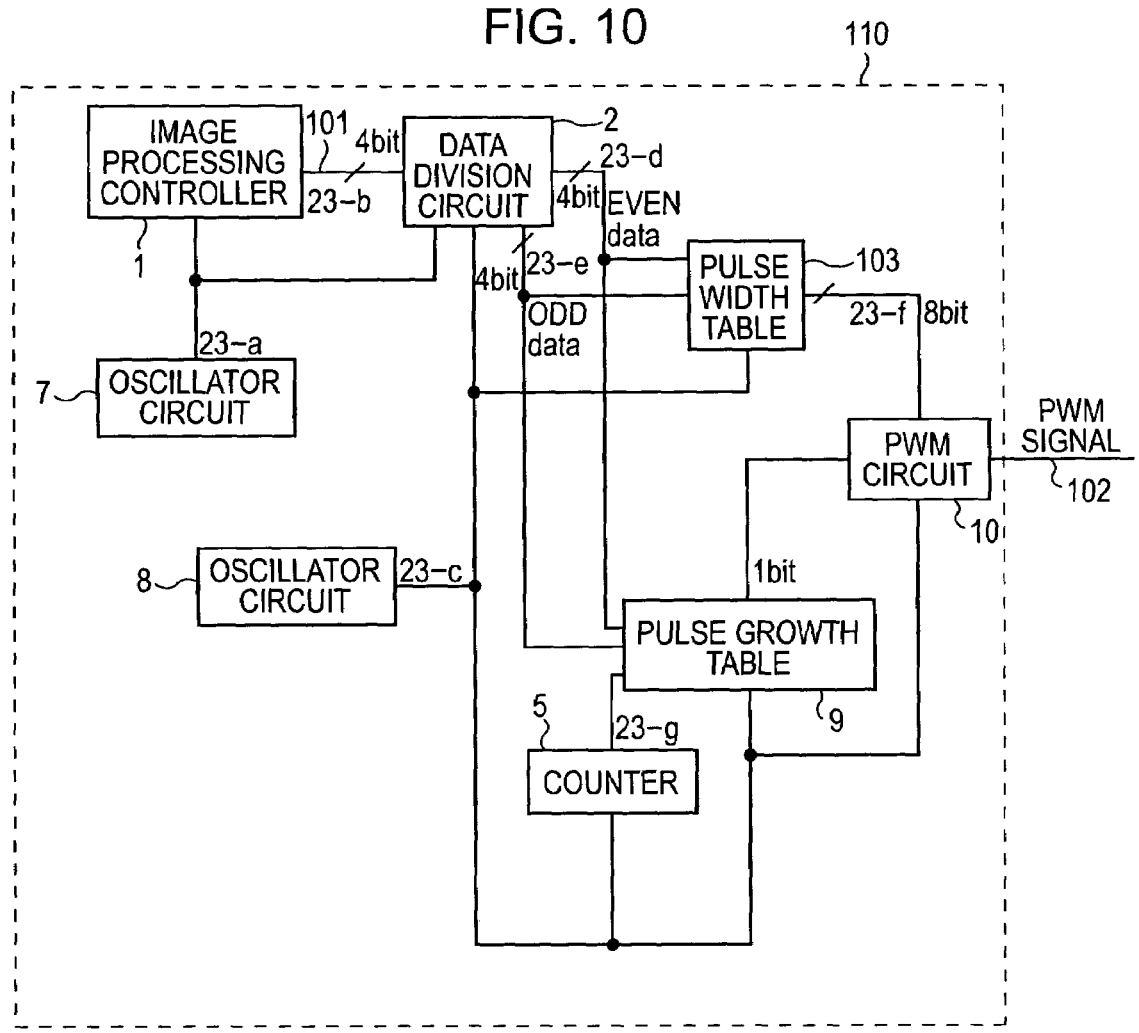
FIG. 10 is a block diagram schematically showing the structure of a laser driver controller according to a third modification.

FIG. 10 is a block diagram schematically showing the structure of a laser driver controller 110 according to a third modification of the laser driver controller 300 in FIG. 3. The laser driver controller 110 in FIG. 10 basically has the same structure as that of the laser driver controller 300 in FIG. 3. The same reference numerals are used in FIG. 10 to identify the same components shown in FIG. 3. A duplicated description of such components is omitted herein and only components different from those in FIG. 3 are described below.

Referring to FIG. 10, the laser driver controller 110 includes a pulse width table 103 and a PWM circuit 10, instead of the pulse width table 3 and the PWM circuit 6 in FIG. 3, and includes a pulse growth table 9, in addition to the components in FIG. 3.

Figure 22:
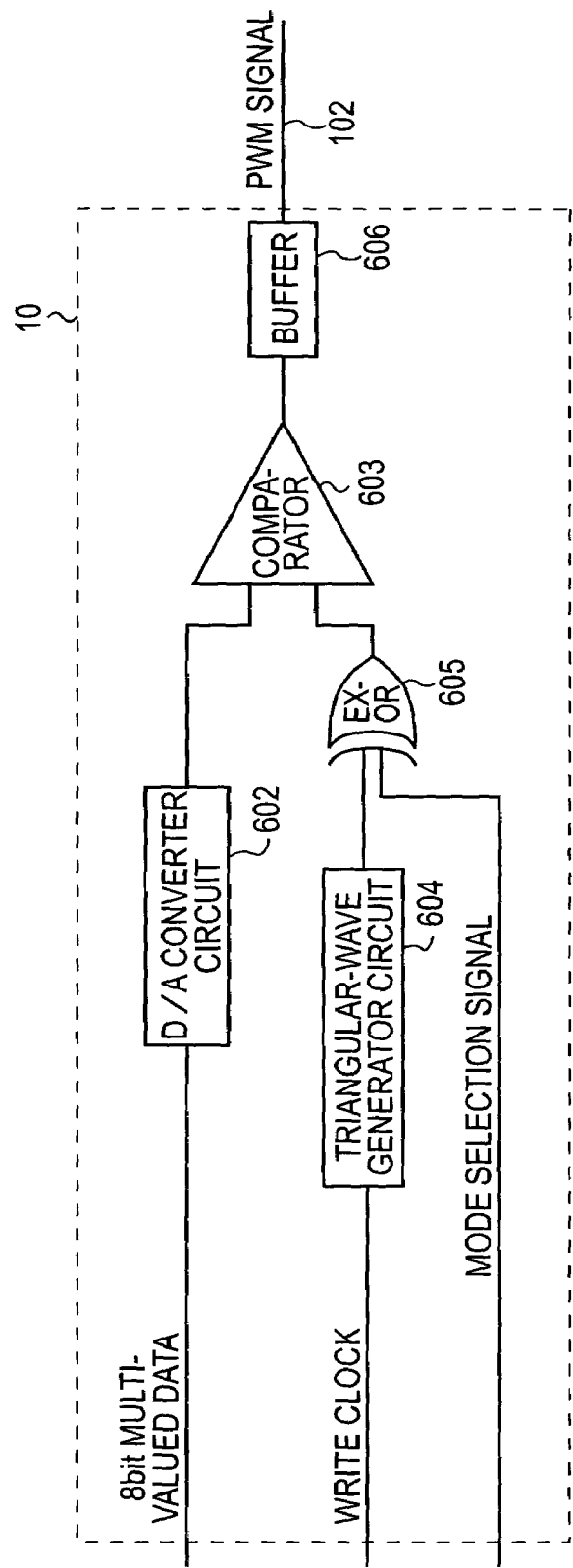
FIG. 22 is a circuit diagram of a PWM circuit in the laser driver controller according to the third modification.

FIG. 22 is a circuit diagram of the PWM circuit 10 in FIG. 10. Referring to FIG. 22, the pulse width table 10 includes a digital-analog (D/A) converter circuit 602, a triangular-wave generator circuit 604, an EX-OR gate 605, a comparator 603, and a buffer 606. The D/A converter circuit 602 converts the pulse width data, which is an 8-bit parallel signal supplied from the pulse width table 103, into an analog voltage. The triangular-wave generator circuit 604 receives the read clock generated by the oscillator circuit 8 to generate a triangular wave having the frequency of the write clock. The EX-OR gate 605 receives the triangular wave generated by the triangular-wave generator circuit 604 and the mode selection signal generated by the counter 5. The comparator 603 compares the output signal from the D/A converter circuit 602 with the output signal from the EX-OR gate 605 to output a PWM signal 102 (FIG. 11B) described below. The buffer 606 supplies the PWM signal 102 received from the comparator 603 to the semiconductor laser 17 through a laser diode driving circuit (not shown).

Figure 23:
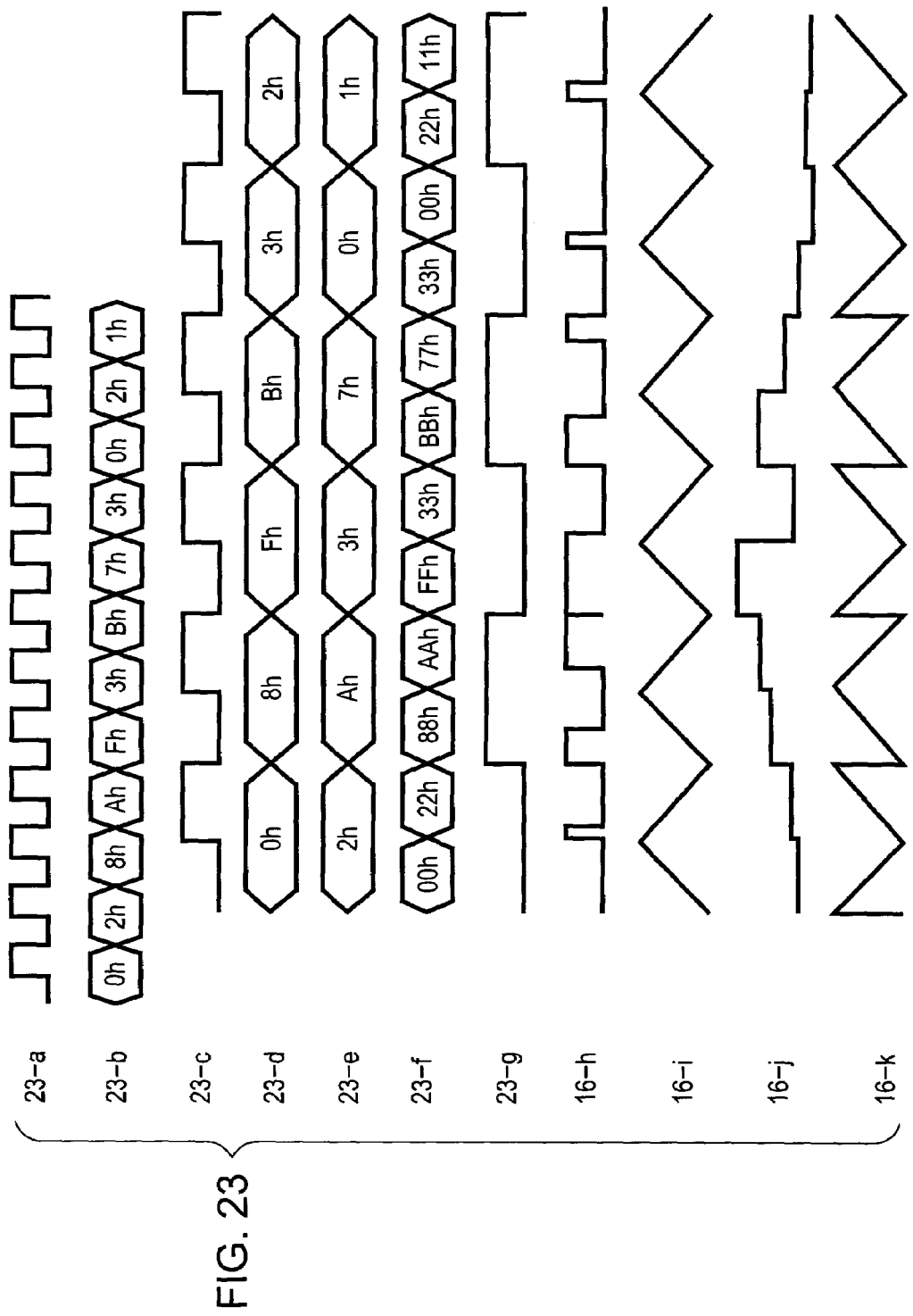
FIG. 23 is a timing chart illustrating the operation of the laser driver controller according to the third modification.

FIG. 23 is a timing chart illustrating the operation of the laser driver controller 110 according to the third modification. Reference numeral and symbol 23-*a* denote an output waveform of the read clock generated by the oscillator circuit 7. Reference numeral and symbol 23-*b* denote the 4-bit pixel data output from the image processing controller 1. The 4-bit pixel data is supplied to the data division circuit 2 in synchronization with the read clock generated by the oscillator circuit 7. Reference numeral and symbol 23-*c* denote an output waveform of the write clock generated by the oscillator circuit 8. Reference numerals and symbols 23-*d* and 23-*e* denote the odd-numbered data and the even-numbered data of the pixel data, respectively, and are supplied to the pulse width table 103 in synchronization with the write clock generated by the oscillator circuit 8.

Figure 24:
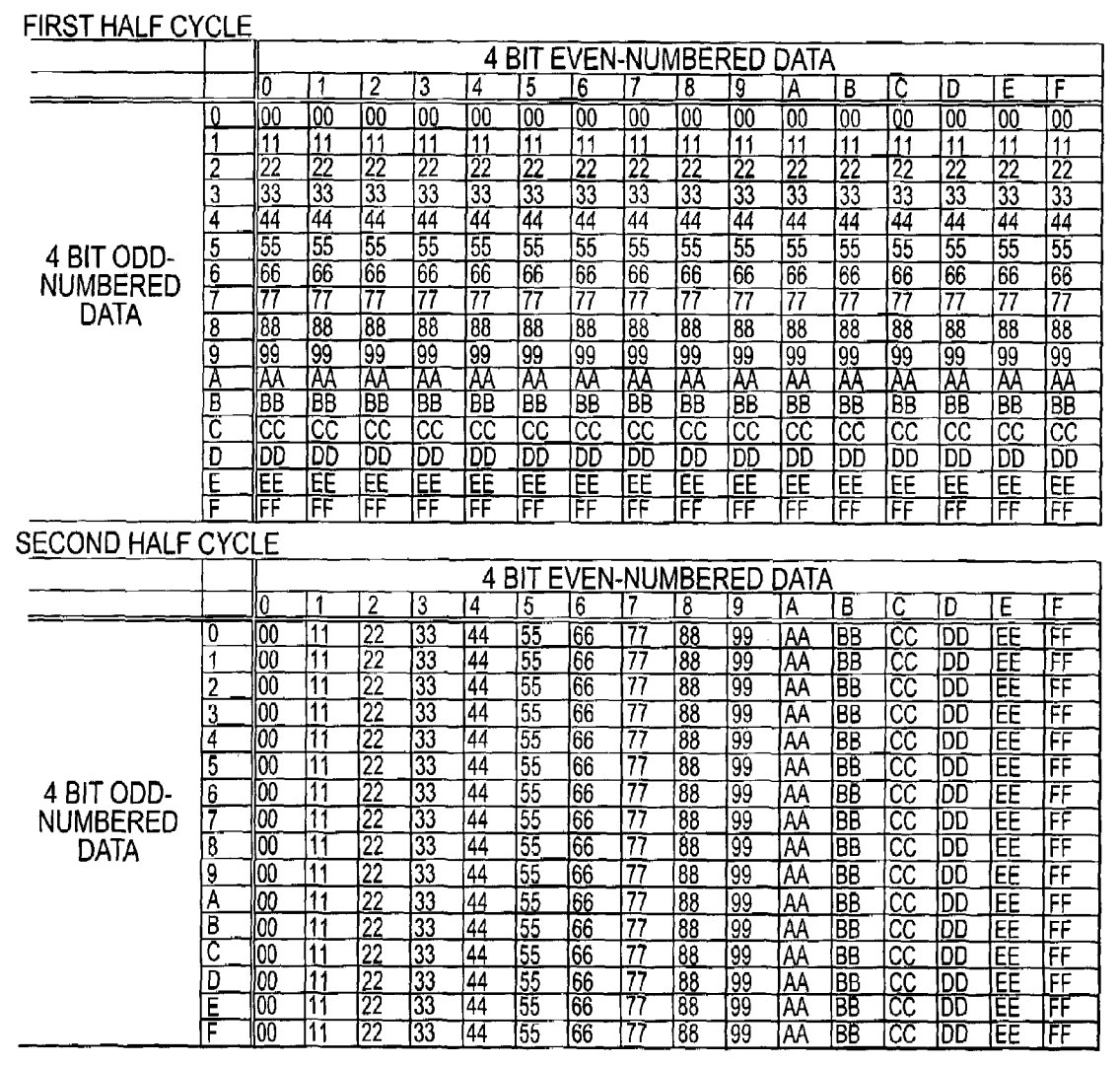

FIG. 24 shows the structure of the pulse width table 103. The pulse width table 103 outputs the 8-bit data stored at addresses of 4-bit odd-numbered data in the first half cycle and outputs the 8-bit data stored at addresses of 4-bit even-numbered data in the second half cycle. This 8-bit data is denoted by 23-*f* in FIG. 23. Referring back to FIG. 23, reference numeral and symbol 23-*g* denote a mode selection signal given by frequency dividing of the write clock generated by the oscillator circuit 8 in the counter 5. Reference numeral and symbol 16-*i* denote the triangular wave generated by the triangular-wave generator circuit 604. Reference numeral and symbol 16-*j* denote an output waveform from the D/A converter circuit 602 converting the 8-bit data received from the pulse width table 3 into the analog voltage. Reference numeral and symbol 16-*k* denote an output from the EX-OR gate 605. The EX-OR gate 605 outputs an inverted waveform of the triangular wave generated by the triangular-wave generator circuit 604 when the mode selection signal denoted by 23-*g* is low (Lo), and outputs a normal waveform of the triangular wave generated by the triangular-wave generator circuit 604 when the mode selection signal denoted by 23-*g* is high (Hi). The comparator 603 compares the output 16-*j* from the D/A converter circuit 602 with the output 16-*k* from the EX-OR gate 605. The signal in the high level (Hi) is output from the comparator 603 when the output from the D/A converter circuit 602 is higher than the output from the EX-OR gate 605, and the signal in the low level (Lo) is output from the comparator 603 when the output from the EX-OR gate 605 is higher than the output from the D/A converter circuit 602. Reference numeral and symbol 16-h denote this waveform output from the comparator 603.

FIGS. 11A-B illustrate the PWM signal output from the PWM circuit 10 shown in FIG. 10. A PWM signal 102 (FIG. 11B) is associated with image data 101 (FIG. 11A) output from the image processing controller 1. The PWM signal 102 is output from the PWM circuit 10.

The image data 101 includes continuous 4-bit pixel data 0H, 2H, 8H, AH, FH, 3H, BH, 7H, 3H, 0H, 2H, and 1H. This pixel data is divided into the odd-numbered data and the even-numbered data by the data division circuit 2. Eight-bit address data generated by pairing the odd-numbered data with the even-numbered data in synchronization with the write clock supplied from the oscillator circuit 8 is stored in the pulse width table 103. The 8-bit pulse width data corresponding to the address data is divided into the half second cycle data and the second half cycle data, and the divided cycle data is supplied to the PWM circuit 10. The PWM circuit 10 generates and outputs the PWM signal 102 in response to one-bit signal that is supplied from the pulse growth table 9 to the PWM circuit 10. The PWM signal 102, for which the pulse growth table 9 determines the central growth method or the left-and-right growth method, includes pixel data 11H, 99H, 99H, 99H, 19H, and 19H having the same pulse width as that of the pulse width data supplied from the pulse width table 103. The pulse of the 8-bit pulse width data 11H corresponding to the odd-numbered data 0H and the even-numbered data 2H is supplied toward the central even-numbered data 2H, the pulse of the 8-bit pulse width data 99H corresponding to the odd-numbered data 8H and the even-numbered data AH is supplied toward the left and right ends, and the pulse of the 8-bit pulse width data 99H corresponding to the odd-numbered data FH and the even-numbered data 3H is supplied toward the central odd-numbered data FH.

In the laser driver controller 110 shown in FIG. 10, the PWM circuit 10 generates and outputs the PWM signal 102 including the pixel data having the same pulse width as that of the pulse width data supplied from the pulse width table 3. The pulse of the 8-bit pulse width data 11H corresponding to the odd-numbered data 0H and the even-numbered data 2H is supplied toward the central even-numbered data 2H, the pulse of the 8-bit pulse width data 99H corresponding to the odd-numbered data 8H and the even-numbered data AH is supplied toward the left and right ends, and the pulse of the 8-bit pulse width data 99H corresponding to the odd-numbered data FH and the even-numbered data 3H is supplied toward the central odd-numbered data FH. Accordingly, the printed image with the original density data being maintained is generated. Furthermore, as described above, since one pixel is represented as the pixel data having the pulse width represented by the central growth method based on the odd-numbered data and the even-numbered data, improving the tone reproducibility of the printed image in a lower density area improves the image quality of the lower density area.

FIGS. 12A-B illustrate the PWM signal output from a PWM circuit 6 according to a fourth modification of the laser driver controller 300 in FIG. 3. The pulse width table 103 in the laser driver controller according to the fourth modification has the structure shown in FIG. 24. The other components in the laser driver controller are the same as in FIG. 10.

Referring to FIGS. 12A-B, a PWM signal 122 (FIG. 12B) is associated with image data 121 (FIG. 12A) output from the image processing controller 1. The PWM signal 122 is output from the PWM circuit 10.

The image data 121 includes continuous 4-bit pixel data 0H, 2H, 8H, AH, FH, 3H, BH, 7H, 3H, 0H, 2H, and 1H. This pixel data is divided into the odd-numbered data and the even-numbered data by the data division circuit 2. Eight-bit address data generated by pairing the odd-numbered data with the even-numbered data in synchronization with the write clock supplied from the oscillator circuit 8 is stored in the pulse width table 103. The 8-bit pulse width data corresponding to the address data is divided into the half second cycle data and the second half cycle data, and the divided cycle data is supplied to the PWM circuit 10. The PWM circuit 10 generates and outputs the PWM signal 122 in response to one-bit signal that is supplied from the pulse growth table 9 to the PWM circuit 10. The PWM circuit 10 generates and outputs the PWM signal 122 including pixel data 15H, 99H, 99H, 99H, 1AH, and 1AH having the same pulse width as that of the pulse width data supplied from the pulse width table 103. The pulse of the 8-bit pulse width data 15H corresponding to the odd-numbered data 0H and the even-numbered data 2H is supplied toward the central even-numbered data 2H, the pulse of the 8-bit pulse width data 99H corresponding to the odd-numbered data 8H and the even-numbered data AH is supplied toward the left and right ends, and the pulse of the 8-bit pulse width data 99H corresponding to the odd-numbered data FH and the even-numbered data 3H is supplied toward the central odd-numbered data FH.

Figure 13:
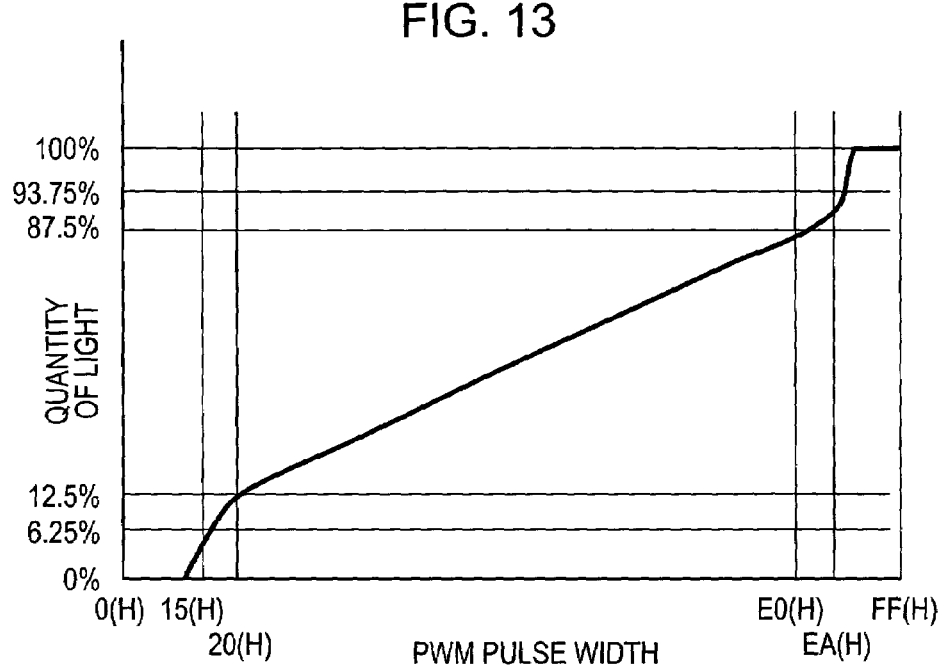
FIG. 13 is a graph showing the current-optical output characteristic of a semiconductor laser according to the fourth embodiment.
Figure 14:
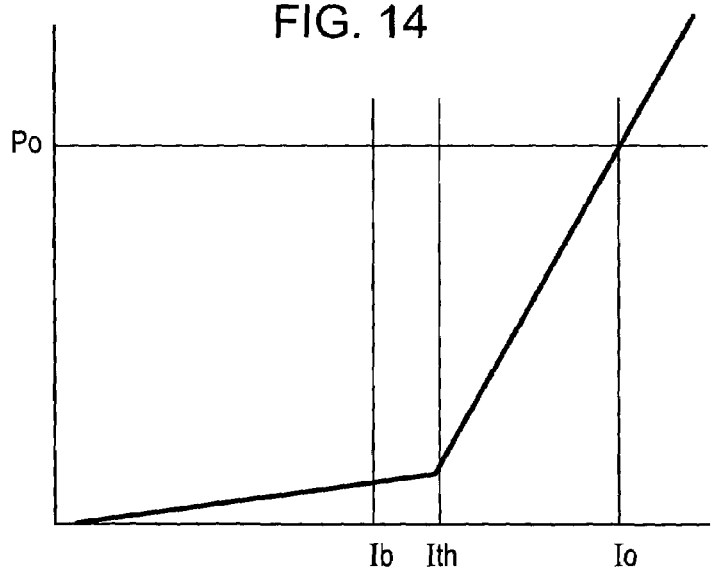
FIG. 14 is a graph showing a current-optical output characteristic.
Figure 15:
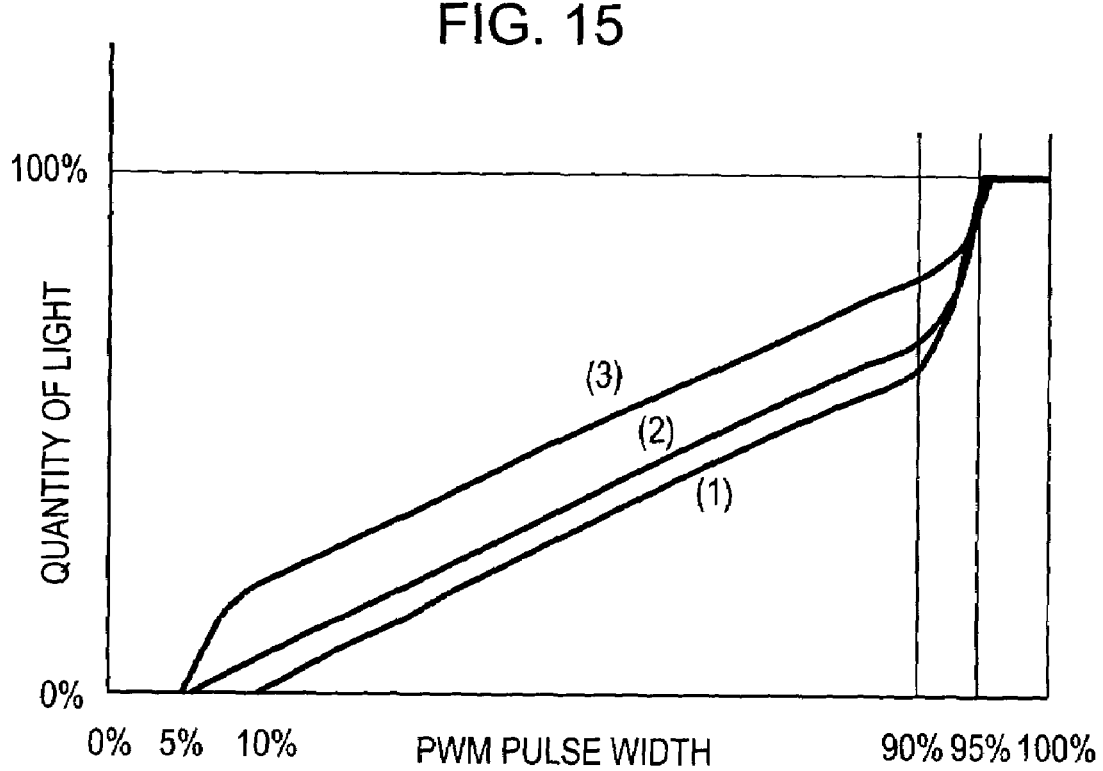
FIG. 15 is a graph showing the relationship between the pulse width of a PWM signal and the integrated value of optical outputs in PWM drive of a semiconductor laser.

The pulse width of the PWM signal 122 has a linear relationship with the quantity of light emitted from the semiconductor laser 17 to which the PWM signal 122 is supplied, in the pulse width from 20H to E0H. As shown in FIG. 13, for example, the quantity of light is 12.5% when the pulse width of the PWM signal 122 is equal to 20H and the quantity of light is 87.5% when the pulse width of the PWM signal 122 is equal to E0H. The duty of the pulse width of the PWM signal 122 coincides with the duty of the quantity of light emitted from the semiconductor laser 17.

However, the pulse width of the PWM signal 122 has a nonlinear relationship with the quantity of light emitted from the semiconductor laser 17 to which the PWM signal 122 is supplied, in the pulse width smaller than 20H and larger than E0H. For example, the quantity of light emitted from the semiconductor laser 17 is 6.25% when the pulse width of the PWM signal 122 is 15H, and the duty of the pulse width of the PWM signal 122 does not coincide with the duty of the quantity of light emitted from the semiconductor laser 17.

According to the fourth modification, with a modified table being used in the pulse width table 3, the pixel data of the PWM signal 122, corresponding to the pixel data 0H and 2H in the image data 121, is equal to 15H and the actual quantity of light is 6.25%. Hence, the duty of the image data coincides with the duty of the quantity of light.

With the structure described above, adopting the pulse width table 3 appropriate for the characteristics of the semiconductor laser 17 provides an image forming apparatus having more superior PWM characteristics.

The same applies to other modifications.

The present invention can be embodied by supplying a storage medium (or a recording medium) having the program code of software realizing the functions according to the above embodiments to a system or an apparatus, the computer (or the CPU or the micro processing unit (MPU)) in which system or apparatus reads out and executes the program code stored in the storage medium.

In this case, the program code itself read out from the storage medium realizes the functions of the embodiments described above. The present invention is applicable to the storage medium having the program code stored therein.

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

The above program may be any program capable of realizing the functions according to the embodiments in a computer. For example, the above program may be an object code, a program executed by an interpreter, or script data supplied to the OS.

The storage medium supplying the program may be any storage medium, such as a random access memory (RAM), a non-volatile RAM (NVRAM), a floppy disco, an optical disk, a magneto-optical disc (MO), a compact disc-read only memory (CD-ROM), a compact disc recordable (CD-R), a compact disc rewritable (CD-RW), a digital versatile disc (a digital versatile disc-read only memory (DVD-ROM), a DVD-RAM, a DVD-RW, a DVD+RW, a magnetic tape, a nonvolatile memory card, or another ROM, which is capable of storing the above program. Alternatively, the above program may be downloaded form another computer or database (not shown) over the Internet, a commercial network, or a local area network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-241163 filed Aug. 20, 2004, No. 2005-192016 filed Jun. 30, 2005, and No. 2005-229457 filed Aug. 8, 2005, which are hereby incorporated by reference herein in their entirety.

What is claimed is:

1. An electrophotographic image forming apparatus comprising:
 a photosensitive material;
 a light source exposing a printed image on the photosensitive material;
 a driving unit blinking and driving the light source;
 a generating unit configured to generate a multi-valued image signal including continuous n-number pieces of first pixel data by image processing;
 a data outputting unit configured to output data corresponding to the multi-valued image signal generated by the generating unit; and
 a converting unit configured to convert the output data into a pulse width signal including continuous m-number pieces of second pixel data via a predetermined pulse growth method,
 wherein the driving unit blinks and drives the light source based on the pulse width signal, and
 wherein a ratio of a resolution between the multi-valued image signal and the exposed printed image is n:m, and n>m (n and m are natural numbers).

2. The image forming apparatus according to claim 1, wherein the predetermined pulse growth method includes one of a central growth method in which a pulse growth is originated from a center of a pixel corresponding to the second pixel data and a left-and-right growth method in which the pulse growth is originated from left and right ends of a pixel corresponding to the second pixel data.

3. The image forming apparatus according to claim 2, wherein an origin of the pulse growth in the predetermined pulse growth method is determined from the output data.

4. The image forming apparatus according to claim 3, further comprising a counting unit counting a number of one of pixel pulses of the multi-valued image signal and the pulse width signal,
 wherein the predetermined pulse growth method is one of the central growth method and the left-and-right growth method in a case of the counted number of pixel pulses being an odd number, and is the other thereof in a case of the counted number of pixel pulses being an even number.

5. The image forming apparatus according to claim 3, wherein the predetermined pulse growth method is the central growth method in a case of the pixel density of the output data being low, and is the left-and-right growth method in a case of the pixel density of the output data being high.

6. The image forming apparatus according to claim 2, wherein an origin of the pulse growth in the predetermined pulse growth method is determined from a pixel density of the first pixel data of the multi-valued image signal.

7. The image forming apparatus according to claim 6, further comprising a counting unit counting a number of one of pixel pulses of the multi-valued image signal and the pulse width signal,
 wherein the predetermined pulse growth method is one of the central growth method and the left-and-right growth method in a case of the counted number of pixel pulses being an odd number, and is the other thereof in a case of the counted number of pixel pulses being an even number.

8. The image forming apparatus according to claim 6, further comprising a counting unit counting a number of one of pixel pulses of the multi-valued image signal and the pulse width signal,
 wherein the predetermined pulse growth method is one of the central growth method and the left-and-right growth method in a case of the counted number of pixel pulses being an even number, and is the other thereof in a case of the counted number of pixel pulses being an odd number.

9. The image forming apparatus according to claim 8, wherein the predetermined pulse growth method is the central growth method in a case of the pixel density of the output data being lower than a first predetermined pixel density, and is the left-and-right growth method in a case of the pixel density of the output data being higher than a second predetermined pixel density that is higher than the first predetermined pixel density.

10. An image forming method of an electrophotographic image forming apparatus including a photosensitive material and a light source exposing a printed image on the photosensitive material, the image forming method comprising the steps of:
 blinking and driving the light source;

generating a multi-valued image signal including continuous n-number pieces of first pixel data by image processing;

outputting data corresponding to the multi-valued image signal generated in the generating step; and converting the output data into a pulse width signal including continuous m-number pieces of second pixel data by a predetermined pulse growth method, wherein the blinking and driving step includes blinking and driving of the light source based on the pulse width signal, and wherein a ratio of a resolution between the multi-valued image signal and the exposed printed image is n:m, and n>m (n and m are natural numbers).

* * * * *